US012574077B2

(12) United States Patent
Zhang et al.

(10) Patent No.: US 12,574,077 B2
(45) Date of Patent: Mar. 10, 2026

(54) CONFIGURING CHANNEL STATE INFORMATION (CSI) FEEDBACK

(71) Applicant: Telefonaktiebolaget LM Ericsson (publ), Stockholm (SE)

(72) Inventors: Xinlin Zhang, Västra Frölunda (SE); Fredrik Athley, Västra Frölunda (SE); Mattias Frenne, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 345 days.

(21) Appl. No.: 18/559,893

(22) PCT Filed: May 11, 2022

(86) PCT No.: PCT/IB2022/054409
§ 371 (c)(1),
(2) Date: Nov. 9, 2023

(87) PCT Pub. No.: WO2022/238942
PCT Pub. Date: Nov. 17, 2022

(65) Prior Publication Data
US 2024/0380442 A1 Nov. 14, 2024

Related U.S. Application Data

(60) Provisional application No. 63/187,244, filed on May 11, 2021.

(51) Int. Cl.
*H04B 7/0417* (2017.01)
*H04B 7/0456* (2017.01)
(Continued)

(52) U.S. Cl.
CPC ......... *H04B 7/0417* (2013.01); *H04B 7/0478* (2013.01); *H04B 7/0626* (2013.01);
(Continued)

(58) Field of Classification Search
None
See application file for complete search history.

(56) References Cited

U.S. PATENT DOCUMENTS

| | | | |
|---|---|---|---|
| 2016/0156401 A1 | 6/2016 | Onggosanusi et al. | |
| 2019/0089437 A1* | 3/2019 | Chen .................... | H04B 7/0456 |
| 2019/0349103 A1* | 11/2019 | Wang .................... | H04B 7/0632 |

FOREIGN PATENT DOCUMENTS

| | | |
|---|---|---|
| WO | 2021/022464 A1 | 2/2021 |
| WO | 2021/068915 A1 | 4/2021 |
| WO | 2021/209206 A1 | 10/2021 |

OTHER PUBLICATIONS

3GPP TS 38.214 V16.5.0 (Mar. 2021) 3rd Generation Partnership Project; Technical Specification Group Radio Access Network; NR; Physical Layer Procedures for Data (Release 16), consisting of 171 pages.

(Continued)

*Primary Examiner* — Anh Ngoc M Nguyen
(74) *Attorney, Agent, or Firm* — Weisberg I.P. Law, P.A.

(57) ABSTRACT

A method, system and apparatus are disclosed. According to one or more embodiments, a wireless device configured to communicate with a network node implementing a plurality of Channel State Information-Reference Signal, CSI-RS, ports is provided. The wireless device includes processing circuitry configured to: receive a configuration of a CSI-RS resource that is associated with the plurality of CSI-RS ports, determine at least a subset of the plurality of CSI-RS ports for performing a CSI-RS measurement within the CSI-RS resource where the determination is based on a calculation using a total number of the plurality of CSI-RS ports and a ratio value, and perform the CSI measurement based on the determined subset of the plurality of CSI-RS ports.

20 Claims, 14 Drawing Sheets

(51) Int. Cl.
    *H04B 7/06*          (2006.01)
    *H04L 5/00*          (2006.01)
    *H04W 72/0453*    (2023.01)

(52) U.S. Cl.
    CPC ......... *H04B 7/0639* (2013.01); *H04L 5/0051* (2013.01); *H04W 72/0453* (2013.01)

(56)              References Cited

OTHER PUBLICATIONS

International Search Report and Written Opinion dated Aug. 3, 2022 issued in PCT Application No. PCT/IB2022/054409, filed May 11, 2022, consisting of 15 pages.

International Preliminary Report on Patentability dated Apr. 28, 2023 issued in PCT Application No. PCT/IB2022/054409, filed May 11, 2022, consisting of 5 pages.

3GPP TSG RAN WG1 Meeting #104-e; R1-2100349; Source: CATT; Title: Further discussion on CSI Enhancements for Rel-17; Agenda Item: 8.1.4; Document for: Discussion and Decision, e-Meeting, Jan. 25-Feb. 5, 2021, consisting of 16 pages.

* cited by examiner

Step 1:
- In UL, UE sounds SRS.
- gNB estimates delay $\tau_i$ and angle $\theta_i$, $\varphi_i$ to propagation clusters.

$\tau_1, \theta_1, \varphi_1$ $\tau_2, \theta_2, \varphi_2$

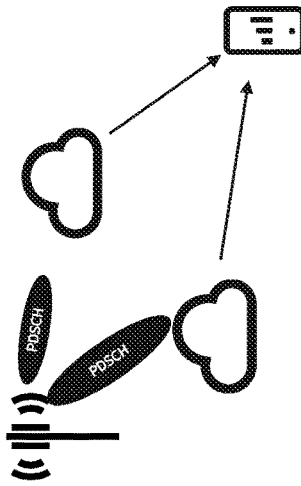

Step 2:
- Based on the estimates $\hat{\tau}_i$, $\hat{\theta}_i$ and $\hat{\varphi}_i$, gNB computes SD and FD precoders $w_{SD}^{(p)}$ and $w_{FD}^{(p)}$ for CSI-RS port $p$, for $p = 1, ..., P$.

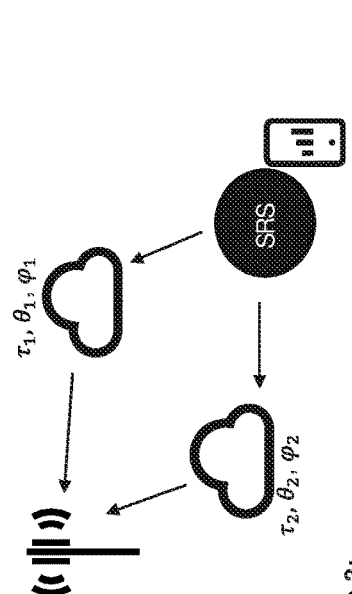

Step 3:
- UE measures the CSI-RS ports, and computes and feeds back the complex coefficients $w_2^{(p)}$ for combining the $P$ ports.

$w_2^{(1)}, w_2^{(2)}$

Step 4:
- In DL, gNB computes PDSCH precoder based on $w_{SD}^{(p)}$, $w_{FD}^{(p)}$ and UE feedback, and performs PDSCH transmission

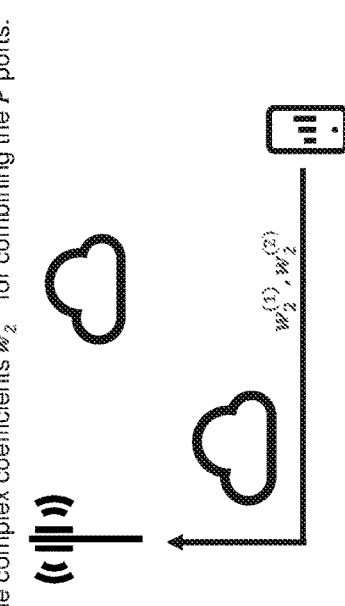

FIG. 5

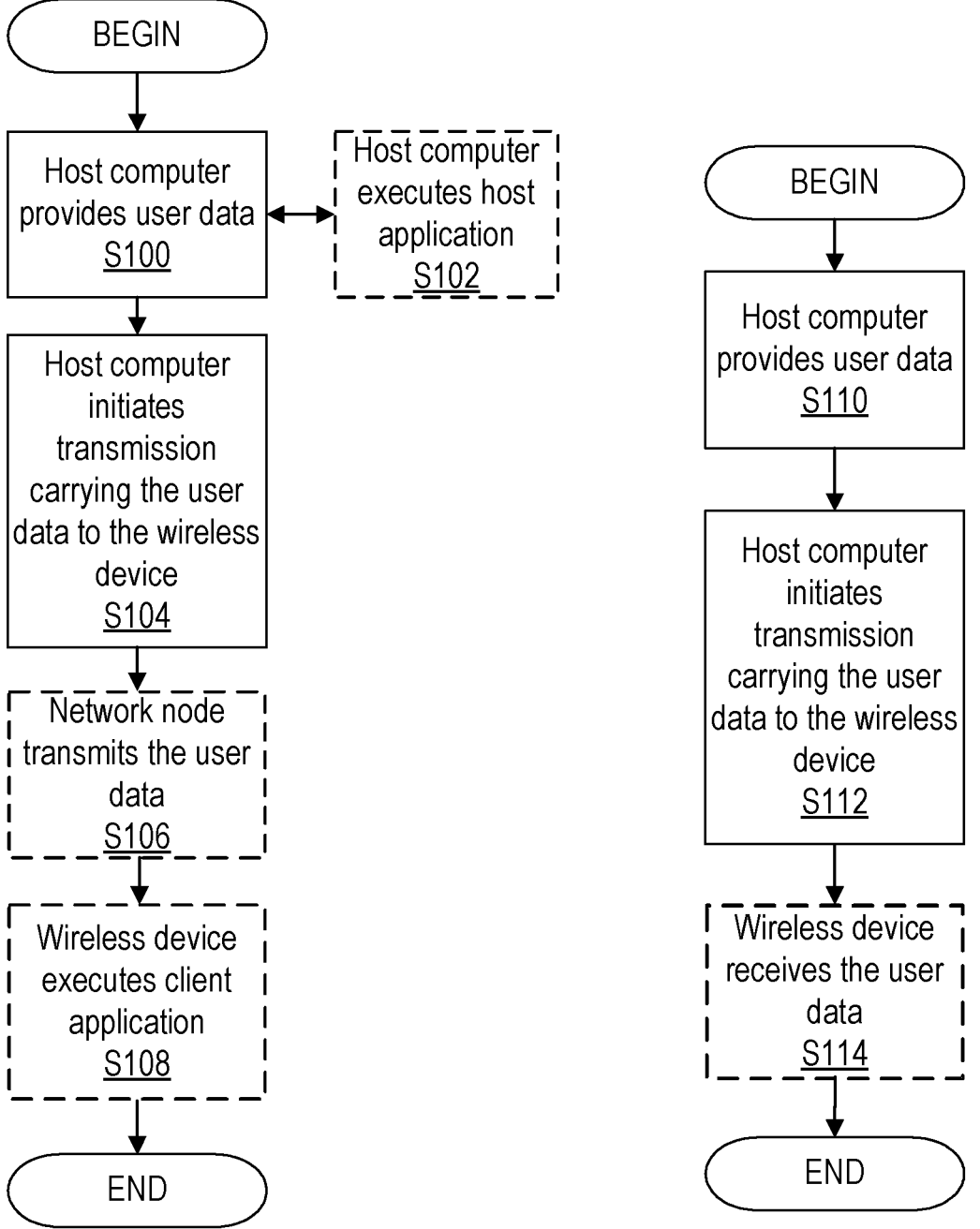
FIG. 9                    FIG. 10

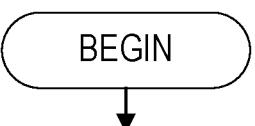

Select at least a subset of a plurality of channel state information-reference signal, CSI-RS, ports for channel measurements where a quantity of the subset of the plurality of CSI-RS ports that is selected is based at least on a total quantity of the plurality of CSI-RS ports
S134

Cause transmission of a configuration for performing CSI measurements on CSI-RS resources associated with the selection of at least the subset of the plurality of CSI-RS ports
S136

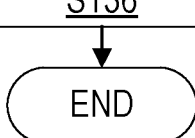

FIG. 13

BEGIN

Transmit a configuration of a CSI-RS resource
S138

Receive CSI feedback based on a CSI measurement where the CSI measurement is based on at least a subset of the plurality of CSI-RS ports within the CSI-RS resource, and where the at least the subset of the plurality of CSI-RS ports is based on a calculation using a total number of the plurality of CSI-RS ports and a ratio value
S140

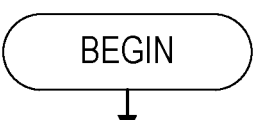

FIG. 14

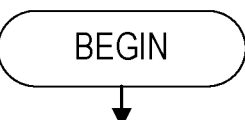

Receive a configuration for performing channel state information, CSI, measurements on CSI-reference signal, RS, resources associated with a selection of at least a subset of a plurality of CSI-RS ports where a quantity of the subset of the plurality of CSI-RS ports that is selected is based at least on a total quantity of the plurality of CSI-RS ports
S142

Perform CSI measurements based at least on the received configuration
S144

Cause transmission of a CSI report based at least on the CSI measurements
S146

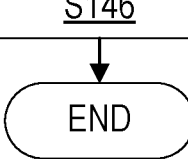

FIG. 15

CONFIGURING CHANNEL STATE INFORMATION (CSI) FEEDBACK

FIELD

The present disclosure relates to wireless communications, and in particular, to configuration and reporting scheme(s) such as, for example, for Third Generation Partnership Project (3GPP) Release 17 New Radio (NR) Type II.

BACKGROUND

Codebook-Based Precoding

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The New Radio (NR, also referred to as $5^{th}$ Generation (5G)) standard is evolving with enhanced MIMO support. A component in NR is the support of MIMO antenna deployments and MIMO related techniques like for instance spatial multiplexing. The spatial multiplexing mode is aimed for high data rates in favorable channel conditions. An example illustration of the spatial multiplexing operation is provided in FIG. 1.

As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

NR uses OFDM in the downlink (and DFT precoded OFDM in the uplink for rank-1 transmission) and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and strives for focusing the transmit energy into a subspace which is strong in the sense of conveying much of the transmitted energy to the wireless device.

In closed-loop precoding for the NR downlink, the wireless device transmits, based on channel measurements in the downlink, recommendations to the network node of a suitable precoder to use. The network node configures the wireless device to provide feedback according to CSI-ReportConfig and may transmit CSI-RS and configure the wireless device to use measurements of CSI-RS to feedback recommended precoding matrices that the wireless device selects from a codebook. A single precoder that is supposed to cover a large bandwidth (wideband precoding) may be fed back. It may also be beneficial to match the frequency variations of the channel and instead feedback a frequency-selective precoding report, e.g., several precoders, one per subband. This is an example of the more general case of channel state information (CSI) feedback, which also encompasses feeding back other information than recommended precoders to assist the network node in subsequent transmissions to the wireless device. Such other information may include channel quality indicators (CQIs) as well as transmission rank indicator (RI). In NR, CSI feedback can be either wideband, where one CSI is reported for the entire channel bandwidth, or frequency-selective, where one CSI is reported for each subband, which is defined as a number of contiguous resource blocks ranging between 4-32 PRBS depending on the band width part (BWP) size.

Given the CSI feedback from the wireless device, network node determines the transmission parameters it wants to use to transmit to the wireless device, including the precoding matrix, transmission rank, and modulation and coding scheme (MCS). These transmission parameters may differ from the recommendations the wireless device makes. The transmission rank, and thus the number of spatially multiplexed layers, is reflected in the number of columns of the precoder W. For efficient performance, it is important that a transmission rank that matches the channel properties is selected.

2D Antenna Arrays

Two-dimensional antenna arrays may be (partly) described by the number of antenna columns corresponding to the horizontal dimension $N_h$, the number of antenna rows corresponding to the vertical dimension $N_v$ and the number of dimensions corresponding to different polarizations $N_p$. The total number of antennas is thus $N=N_h N_v N_p$. The concept of an antenna is non-limiting in the sense that it can refer to any virtualization (e.g., linear mapping) of the physical antenna elements. For example, pairs of physical sub-elements could be fed the same signal, and hence share the same virtualized antenna port.

An example of a 4×4 array with dual-polarized antenna elements is illustrated in FIG. 2 where a two-dimensional antenna array of dual-polarized antenna elements ($N_p=2$), with $N_h=4$ horizontal antenna elements and $N_v=4$ vertical antenna elements are provided.

Precoding may be interpreted as multiplying the signal with different beamforming weights for each antenna prior to transmission. A typical approach is to tailor the precoder to the antenna form factor, i.e., taking into account $N_h$, $N_v$ and $N_p$ when designing the precoder codebook.

Channel State Information Reference Signals (CSI-RS)

For CSI measurement and feedback, CSI-RS are defined. A CSI-RS is transmitted on each antenna port and is used by a wireless device to measure downlink channel between each of the transmit antenna ports and each of its receive antenna ports. The transmit antenna ports are also referred to as CSI-RS ports. The supported number of antenna ports in NR are {1,2,4,8,12,16,24,32}. By measuring the received CSI-RS, a wireless device can estimate the channel that the CSI-RS is traversing, including the radio propagation channel and antenna gains. The CSI-RS for the above purpose is also referred to as Non-Zero Power (NZP) CSI-RS.

CSI-RS can be configured to be transmitted in certain REs in a slot and certain slots. FIG. 3 is a diagram of an example of CSI-RS REs for 12 antenna ports, where 1RE per RB per port is shown.

In addition, interference measurement resource (IMR) is also defined in NR for a wireless device to measure interference. An IMR resource contains 4 REs, either 4 adjacent RE in frequency in the same OFDM symbol or 2 by 2 adjacent REs in both time and frequency in a slot. By measuring both the channel based on NZP CSI-RS and the interference based on an IMR, a wireless device can estimate the effective channel and noise plus interference to determine the CSI, i.e., rank, precoding matrix, and the channel quality.

Furthermore, a wireless device in NR may be configured to measure interference based on one or multiple NZP CSI-RS resource.

CSI Framework in NR

In NR, a wireless device can be configured with multiple CSI reporting settings and multiple CSI-RS resource settings. Each resource setting can contain multiple resource sets, and each resource set can contain up to 8 CSI-RS resources. For each CSI reporting setting, a wireless device feeds back a CSI report.

Each CSI reporting setting contains at least some of the following information:

A CSI-RS resource set for channel measurement.

An IMR resource set for interference measurement.

Optionally, a CSI-RS resource set for interference measurement.

Time-domain behavior, i.e., periodic, semi-persistent, or aperiodic reporting.

Frequency granularity, i.e., wideband or subband.

CSI parameters to be reported such as RI, PMI, CQI, and CSI-RS resource indicator (CRI) in case of multiple CSI-RS resources in a resource set.

Codebook types, i.e., type I or II, and codebook subset restriction.

Measurement restriction.

Subband size. One out of two possible subband sizes is indicated, the value range depends on the bandwidth of the BWP. One CQI/PMI (if configured for subband reporting) is fed back per subband).

When the CSI-RS resource set in a CSI reporting setting contains multiple CSI-RS resources, one of the CSI-RS resources is selected by a wireless device and a CSI-RS resource indicator (CRI) is also reported by the wireless device to indicate to the network node about the selected CSI-RS resource in the resource set, together with RI, PMI and CQI associated with the selected CSI-RS resource.

For aperiodic CSI reporting in NR, more than one CSI reporting settings, each with a different CSI-RS resource set for channel measurement and/or resource set for interference measurement can be configured and triggered at the same time. In this case, multiple CSI reports are aggregated and sent from the UE to the gNB in a single PUSCH.

NR Rel-15 Type II Codebook

For the NR Type II codebook in 3GPP Release-15 (Rel 15), the precoding vector for each layer and subband is, for example, expressed in 3GPP standards such as in, for example, 3GPP specification Technical Specification (TS) 38.214.

If this formula in 3GPP specification TS 38.214 and express a less complex manner, the following is formed: the precoder vector $w_{l,p}(k)$ for a certain layer l=0, 1, polarization p=0, 1 and resource block k=0, . . . , $N_{RB}-1$ as $$w_{l,p}(k) = \frac{1}{C}\sum_{i=0}^{L-1} v_i p_{l,i}^{(1)} c_{l,i}(k)$$

where $c_{l,i}(k) = p_{l,i}^{(2)}\left(\left\lfloor\frac{k}{S}\right\rfloor\right)\varphi_{l,i}\left(\left\lfloor\frac{k}{S}\right\rfloor\right)$ for $p = 0$ and $c_{l,i}(k) = p_{l,L+i}^{(2)}\left(\left\lfloor\frac{k}{S}\right\rfloor\right)\varphi_{l,L+i}\left(\left\lfloor\frac{k}{S}\right\rfloor\right)$ for p=1, S is the subband size and $N_{SB}$ is the number of subbands in the CSI reporting bandwidth. Hence, the change in a beam coefficient across frequency $c_{l,i}(k)$ is determined based on the $2N_{SB}$ parameters $p_{l,i}^{(2)}(0), . . . , p_{l,i}^{(2)}(N_{SB}-1)$ and $\varphi_{l,i}(0), . . . , \varphi_{l,i}(N_{SB}-1)$. Where the subband amplitude parameter $p_{l,i}^{(2)}$ is quantized using 0-1 bit and the subband phase parameter $\varphi_{l,i}$ is quantized using 2-3 bits, depending on codebook configuration.

NR 3GPP Rel-16 Enhanced Type II Port Selection Codebook

The enhanced Type II (eType II) port selection (PS) codebook was introduced in 3GPP Rel-16, which is intended to be used for beamformed CSI-RS, where each CSI-RS port covers a small portion of the cell coverage area with high beamforming gain (comparing to non-beamformed CSI-RS). Although it is up to the network node implementation, it is usually assumed that each CSI-RS port is transmitted in a 2D spatial beam which has a main lobe with an azimuth pointing angle and an elevation pointing angle. The actual precoder matrix used for CSI-RS is transparent to the wireless device. Based on the measurement, the wireless device selects the best CSI-RS ports and recommends a rank, a precoding matrix, and a CQI conditioned on the rank and the precoding matrix to the network node to use for DL transmission. The precoding matrix comprises linear combinations of the selected CSI-RS ports. The eType II PS codebook can be used by the wireless device to feedback the selected CSI-RS ports and the combining coefficients.

Structure, Configuration and Reporting of eType II PS Codebook

For a given transmission layer l, with l∈{1, . . . , v} and v being the rank indicated by the rank indicator (RI), the precoder matrix is given by a size $P_{CSI-RS}×N_3$ matrix $W^l$, where $P_{CSI-RS}$ is the number of CSI-RS ports.

$N_3=N_{SB}×R$ is the number of subbands for PMI, where

The value R={1,2} (the PMI subband size indicator) is RRC configured.

$N_{SB}$ is the number of CQI subbands, which is also RRC configured.

The maximum RI value v is set according to the configured higher layer parameter typeII-RI-Restriction-r16. The wireless device does not report v>4.

For each layer l, the precoding matrix $W^l$ can be factorized as $W^l=W_1 W_{2,l} W_{f,l}^H$ (as illustrated in the example of FIG. 4) and $W^l=[w_{0,l}, w_{1,l}, . . . , w_{N_3-1,l}]$ is normalized such that $\|w_{t,l}\|_F=1/\sqrt{v}$, for l=1, . . . , v and t=0, 1, . . . , $N_3-1$.

Port selection matrix $W_1$:

$W_1$ is a size $P_{CSI-RS}×2L$ port selection precoder matrix that can be factorized into $$W_1 = \begin{bmatrix} 1 & 0 \\ 0 & 1 \end{bmatrix} \otimes W_{PS},$$

where $\otimes$ denotes Kronecker product and:

$$W_{PS} = \begin{bmatrix} w_1^{(0)} & \dots & w_1^{(L-1)} \end{bmatrix}$$

is a size $$\frac{P_{CSI-RS}}{2} \times L$$

port selection matrix, where $w_1^{(i)}$ of a size $$\frac{P_{CSI-RS}}{2} \times 1,$$

for $i=0, 1, \dots, L-1$, contains one element 1 that indicates the selected CSI-RS port while all the other elements are 0s. L is the number of selected CSI-RS ports from each polarization and the same ports are selected for both polarizations.

Supported L values can be found in Table 1.

Selected CSI-RS ports are indicated by $$i_{1,1} \in \left\{ 0, 1, \dots, \left\lceil \frac{P_{CSI-RS}}{2d} \right\rceil - 1 \right\},$$

which is reported by the UE to the network node, e.g., gNB.

The value of $i_{1,1}$ is determined by wireless device based on CSI-RS measurement.

The value of d is configured with the higher layer parameter portSelectionSamplingSize, where $d \in \{1, 2, 3, 4\}$ and $d < \min$ $$\left( \frac{P_{CSI-RS}}{2}, L \right).$$

$W_1$ is common for all layers.

Frequency-domain (FD) compression matrix $W_{f,l}$:

$W_{f,l}$ is a size $N_3 \times M_v$ FD compression matrix for layer l, where $$M_v = \left\lceil p_v \frac{N_3}{R} \right\rceil$$

is the number of selected FD basis vectors, which depends on the rank indicator v and the RRC configured parameter $p_v$. Supported values of $p_v$ can be found in Table 1.

$W_{f,l} = [w_{f,l}^{(0)} \dots w_{f,l}^{(M_v-1)}]$, where $\{w_{f,l}^{(k)}\}_{k=0}^{M_v-1}$ are $M_v$ FD basis vectors that are selected from $N_3$ orthogonal DFT basis vectors $\{f_t\}_{t=0}^{N_3-1}$, where $f_t=$ $$\left[ 1 e^{\frac{j2\pi t}{N_3}}, \dots, e^{\frac{j2\pi(N_3-1)t}{N_3}} \right]^T,$$

$(.)^T$ denotes transpose.

For $N_3 \leq 19$, a one-step free selection is used.

For each layer, FD basis selection is indicated with a $$\left\lceil \log_2 \binom{N_3-1}{M_v-1} \right\rceil$$

bit combinatorial indicator. In 3GPP standards such as in, for example, 3GPP TS 38.214, the combinatorial indicator is given by the index $i_{1,6,l}$ where l corresponds to the layer index. This combinatorial index is reported by wireless device to the network node per layer.

For $N_3 > 19$, a two-step selection with layer-common intermediary subset (IntS) is used.

In this first step, a window-based layer-common IntS selection is used, which is parameterized by $M_{initial}$. The IntS consists of FD basis vectors mod $(M_{initial}+n, N_3)$, where $n=0, 1, \dots, N'_3-1$ and $N'_3=2M_v$. In TS 38.214, the selected IntS is reported by the UE to the gNB via the parameter $i_{1,5}$, which is reported per layer as part of the PMI reported.

The second step subset selection is indicated by an $$\left\lceil \log_2 \binom{N'_3-1}{M_v-1} \right\rceil$$

bit combinatorial indicator for each layer. In 3GPP standards such as in, for example, 3GPP TS 38.214, the combinatorial indicator is given by the index $i_{1,6,l}$ where l corresponds to the layer index. This combinatorial index is reported by the wireless device to the network node per layer.

$W_{f,l}$ is layer-specific.

Linear combination coefficient matrix $W_{2,l}$:

$W_{2,l}$ is a size $2L \times M_v$ matrix that contains $2LM_v$ coefficients for linearly combining the selected $M_v$ FD basis vectors and the selected 2L CSI-RS ports.

For layer l, only a subset of $K_l^{NZ} \leq K_0$ coefficients are non-zero and reported. The remaining $2LM_v - K_l^{NZ}$ non-reported coefficients are considered zero.

$K_0 = \lceil \beta \times 2LM_1 \rceil$ is the maximum number of non-zero coefficients per layer, where $\beta$ is a RRC configured parameter. Supported $\beta$ values are shown in Table 1.

For $v \in \{2, 3, 4\}$, the total number of non-zero coefficients summed across all layers, $K_{tot}^{NZ} = \Sigma_{l=1}^v K_l^{NZ}$, shall satisfy $K_{tot}^{NZ} \leq 2K_0$.

Selected coefficient subset for each layer is indicated with $K_l^{NZ}$ 1s in a size $2LM_v$ bitmap, $i_{1,7,l}$.

The selected CSI-RS port associated with the strongest coefficient of layer l is identified by $i_{1,8,l} \in \{0, 1, \dots, 2L-1\}$.

The amplitude coefficients in $W_{2,l}$ are indicated by $i_{2,3,l}$ and $i_{2,4,l}$, and the phase coefficients in $W_{2,l}$ are indicated by $i_{2,5,l}$. $W_{2,l}$ is layer-specific.

TABLE 1

3GPP Rel-16 Type II PS codebook parameter
configurations for L, $p_v$ and $\beta$

| paramCombination-r16 | L | $p_v$ | | $\beta$ |
|---|---|---|---|---|
| | | $v \in \{1, 2\}$ | $v \in \{3, 4\}$ | |
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |

The PMI reported by the wireless device includes comprises codebook indices $i_1$ and $i_2$ where $$i_1 = \begin{cases} [i_{1,1} \ i_{1,5} \ i_{1,6,1} \ i_{1,7,1} \ i_{1,8,1}] & v = 1 \\ [i_{1,1} \ i_{1,5} \ i_{1,6,1} \ i_{1,7,1} \ i_{1,8,1} \ i_{1,6,2} \ i_{1,7,2} \ i_{1,8,2}] & v = 2 \\ [i_{1,1} \ i_{1,5} \ i_{1,6,1} \ i_{1,7,1} \ i_{1,8,1} \ i_{1,6,2} \ i_{1,7,2} \ i_{1,8,2} \ i_{1,6,3} \ i_{1,7,3} \ i_{1,8,3}] & v = 3 \\ [i_{1,1} \ i_{1,5} \ i_{1,6,1} \ i_{1,7,1} \ i_{1,8,1} \ i_{1,6,2} \ i_{1,7,2} \ i_{1,8,2} \ i_{1,6,3} \ i_{1,7,3} \ i_{1,8,3} \ i_{1,6,4} \ i_{1,7,4} \ i_{1,8,4}] & v = 4 \end{cases}$$

$$i_2 = \begin{cases} [i_{2,3,1} \ i_{2,4,1} \ i_{2,5,1}] & v = 1 \\ [i_{2,3,1} \ i_{2,4,1} \ i_{2,5,1} \ i_{2,3,2} \ i_{2,4,2} \ i_{2,5,2}] & v = 2 \\ [i_{2,3,1} \ i_{2,4,1} \ i_{2,5,1} \ i_{2,3,2} \ i_{2,4,2} \ i_{2,5,2} \ i_{2,3,3} \ i_{2,4,3} \ i_{2,5,3}] & v = 3 \\ [i_{2,3,1} \ i_{2,4,1} \ i_{2,5,1} \ i_{2,3,2} \ i_{2,4,2} \ i_{2,5,2} \ i_{2,3,3} \ i_{2,4,3} \ i_{2,5,3} \ i_{2,3,4} \ i_{2,4,4} \ i_{2,5,4}] & v = 4 \end{cases}$$

The precoding matrix is the PMI values according to Table 1.

TABLE 1

Precoding matrix indicated by PMI.

| Numbers of layers | Precoding Matrix for PMI subband $t \in (0, 1, \ldots, N_3)$ |
|---|---|
| $v = 1$ | $W_t^{(v=1)} = w_{1,t}$ |
| $v = 2$ | $W_t^{(v=2)} = [w_{1,t} \ w_{2,t}]$ |
| $v = 3$ | $W_t^{(v=3)} = [w_{1,t} \ w_{2,t} \ w_{3,t}]$ |
| $v = 4$ | $W_t^{(v=4)} = [w_{1,t} \ w_{2,t} \ w_{3,t} \ w_{4,t}]$ |

$$w_{l,t} = \frac{1}{\sqrt[2]{v}} \frac{1}{\sqrt[2]{\gamma_{t,l}}} \begin{bmatrix} \sum_{i=0}^{L-1} v_{i_{1,1}d+i} p_{l,0}^{(1)} \sum_{f=0}^{M_v-1} y_{t,l}^{(f)} p_{l,i,f}^{(2)} \varphi_{l,i,f} \\ \sum_{i=0}^{L-1} v_{i_{l,1}d+i} p_{l,1}^{(1)} \sum_{f=0}^{M_v-1} y_{t,l}^{(f)} p_{l,i+L,f}^{(2)} \varphi_{l,i+L,f} \end{bmatrix},$$

$l = 1, 2, 3, 4; t = 0, 1, \ldots, N_3 - 1.$ $$\gamma_{t,l} = \sum_{i=0}^{2L-1} \left( p_{l,\lfloor \frac{i}{L} \rfloor}^{(1)} \right)^2 \left| \sum_{f=0}^{M_v-1} y_{t,l}^{(f)} p_{l,i,f}^{(2)} \varphi_{l,i,f} \right|^2$$

$v_m$ is a $P_{CSI-RS}/2$ -element column vector containing a value of 1 in element (m mod $P_{CSI-RS}/2$) and zeros elsewhere $$y_{t,l}^{(f)} = e^{j\frac{2\pi t n_{3,l}^{(f)}}{N_3}}, t = 0, 1, \ldots, N_3 - 1; f = 0, 1, \ldots, M_v - 1; l = 1, 2, 3, 4.$$

$n_{3,l}^{(f)} \in (0,1, \ldots, N_3 - 1)$ is derived from $i_{1,6,l}$ and if $N_3 > 19$, $i_{1,5}$
$p_{ip}^{(1)}, p \in (0,1)$ is a wideband amplitude coefficient indicated by $i_{2,3,l}$
$p_{l,i,f}^{(2)}$ is a subband amplitude coefficient indicated by $i_{2,4,l}$ $$\varphi_{l,i,f} = e^{j\frac{2\pi c_{l,i,f}}{16}}, c_{l,i,f} \in (0, \ldots, 15) \text{ is phase coefficient indicted by } i_{2,5,l}$$

For 3GPP Rel-16 Enhanced Type II CSI feedback, a CSI report includes two parts. Part 1 has a fixed payload size and is used to identify the number of information bits in Part 2. Part 1 contains RI, CQI, and an indication of the overall number of non-zero amplitude coefficients across layers, i.e., $K_{tot}^{NZ} \in \{1, 2, \ldots, 2K_0\}$. Part 2 contains the PMI. Part 1 and 2 are separately encoded.

FDD-Based Reciprocity Operation and 3GPP Rel-17 Type II Port Selection Codebook

In FDD operation, the UL and DL transmissions are carried out on different frequencies, thus the propagation channels in UL and DL are not reciprocal as in the TDD case. Despite of this, some physical channel parameters, e.g., delays and angles to different clusters, which depend on the spatial properties of the channel but not the carrier frequency, are reciprocal between UL and DL. Such properties can be exploited to obtain partial reciprocity based FDD transmission. The reciprocal part of the channel can be combined with the non-reciprocal part in order to obtain the complete channel. An estimate of the non-reciprocal part can be obtained by feedback from the wireless device. In 3GPP RAN1, it was discussed that in 3GPP Rel-17, the 3GPP Rel-16 Type II port selection codebook will be enhanced to support the above the above-mentioned FDD-based reciprocity operation. It has been discussed in 3GPP RAN1 #104e that the 3GPP Rel-17 Type II port selection codebook will adopt the same codebook structure as the 3GPP Rel-16 Type II port selection codebook, i.e., the codebook consists $W_1$, $W_2$, and $W_f$. Discussion in 3GPP regarding the details of the codebook component, such as dimension of each matrix, is still ongoing.

Procedure for FDD-Based Reciprocity Operation

One example procedure for reciprocity based FDD transmission scheme is illustrated in FIG. 5 in 4 steps, assuming that NR 3GPP Rel 16 enhanced Type II port-selection codebook is used.

In Step 1, the wireless device is configured with SRS by the network node and the wireless device transmits SRS in the UL for the network node to estimate the angles and delays of different clusters, which are associated with different propagation paths.

In Step 2, in network node implementation algorithm, the network node selects dominant clusters according to the estimated angle-delay power spectrum profile, based on which a set of spatial-domain and frequency-domain (SD-FD) basis pairs are computed by network node for CSI-RS beamforming. Each SD-FD pair corresponds to a CSI-RS port with certain delay being pre-compensated. Each CSI-RS port resource can contain one or multiple SD-FD basis pairs by applying different delays on different resource elements of the resource. The network node precodes all the CSI-RS ports in a configured CSI-RS resource or multiple CSI-RS resources to the wireless device, with each configured CSI-RS resource containing the same number of SD-FD basis pairs.

In Step 3. The network node has configured the wireless device to measure CSI-RS, and the wireless device measures the received CSI-RS ports and then determines a type II CSI including RI, PMI for each layer and CQI. The precoding matrix indicated by the PMI includes the selected SD-FD basis pairs/precoded CSI-RS ports, and the corresponding best phase and amplitude for co-phasing the selected pairs/ ports. The phase and amplitude for each pair/port are quantized and fed back to the network node.

In Step 4, the network node implementation algorithm computes the DL precoding matrix per layer based on the selected beams and the corresponding amplitude and phase feedback and performs PDSCH transmission. The transmission is based on the feed-back (PMI) precoding matrices directly (e.g., SU-MIMO transmission) or the transmission precoding matrix is obtained from an algorithm combining CSI feedback from multiple wireless devices (MU-MIMO transmission). In this case, a precoder derived based on the precoding matrices (including the CSI reports from co-scheduled wireless devices) (e.g., Zero-Forcing precoder or regularized ZF precoder). The final precoder may be scaled so that the transmit power per power amplifier is not overridden Such reciprocity-based transmission can potentially be utilized in a codebook-based DL transmission for FDD in order to, for example, reduce the feedback overhead in UL when NR Type II port-selection codebook is used. Another potential benefit is reduced complexity in the CSI calculation in the wireless device.

Note that FIG. 5 provides one example of the procedure for FDD-based reciprocity operation, where each CSI-RS port contains a single pair of SD-FD basis and the wireless device performs wideband averaging of the channel to obtain the corresponding coefficients. It is possible that each CSI-RS port contains multiple pairs of SD-FD basis and that the wireless device can compress the channel with more FD components besides the DC DFT component.

Type II Port Selection Codebook for FDD Operation Based on Angle and Delay Reciprocity If the 3GPP Rel 16 enhanced Type II port-selection codebook is used for FDD operation based on angle and/or delay reciprocity, the frequency-domain (FD) basis $W_f$ still needs to be determined by the wireless device. Therefore, in the CSI report, the feedback overhead for indicating which FD basis vectors are selected can be large, especially when $N_3$, the number of PMI subbands, is large. Also, the computational complexity at the wireless device for evaluating and selecting the best FD basis vectors also increases as $N_3$ increases. In addition, the channel seen at the wireless device is frequency-selective, which requires a number of FD basis vectors to compress in the PMI report. Reporting coefficients to these FD basis vectors also consumes a large amount of UL overhead.

Based on the angle and delay reciprocity, as mentioned in the previous section, the network node can determine a set of dominant clusters in the propagation channel by analyzing the angle-delay power spectrum of the UL channel. Then, the network node can utilize this information in a way such that each CSI-RS port is precoded towards a dominant cluster. In addition to SD beamforming, each of the CSI-RS ports will also be pre-compensated in time such that all the precoded CSI-RS ports are aligned in delay domain. As a result, frequency-selectivity of the channel is removed and the wireless device observes a frequency-flat channel, which requires very small number of FD basis to compress. Ideally, if all the beams can be perfectly aligned in time, the wireless device may only need to do a wideband filtering to obtain all the channel information, based on which wireless device can calculate the Rel-17 Type II PMI. Even if delay cannot be perfectly pre-compensated at the network node in reality, the frequency selectively seen at the wireless device can still be greatly reduced, so that wireless device only requires a much smaller number of FD basis vectors, i.e., the number of basis vectors in $W_f$, to compress the channel.

The above procedure is illustrated in FIG. 6 in an example. Based on UL measurement, the network node identifies 8 dominant clusters that exist in the original channel, tagged as A-G, which are distributed in 4 directions, with each direction containing one or multiple taps. In this example, 8 CSI-RS ports are precoded at the network node. Each CSI-RS port is precoded towards a dominant direction with pre-compensated delay for a given clusters. The delay compensation can be realized in different ways, for instance by applying a linear phase slope across occupied subcarriers. As a result, in the beamformed channel, which is seen at wireless device, all the dominant clusters are aligned at the same delay, hence the wireless device only needs to apply a wideband filter (e.g., applying the DC component of a DFT matrix (i.e., $W_f$ containing a single all one vector over frequency domain channel) to compress the channel and preserve all the channel information. Based on the compressed channel, the wireless device calculates $W_1$ (selected CSI-RS ports) and $W_2$ (complex coefficients for combining selected ports), which are the remaining part of the Type II port selection codebook.

Although the discussion on 3GPP Rel-17 Type II (also referred to as Rel 17 Type II or Rel 17 NR Type II) codebook is still ongoing, the 3GPP Rel-16 Type II codebook structure has been confirmed to be reused for 3GPP Rel-17, i.e., the 3GPP Rel-17 also comprises of $W_1$, $W_2$ and $W_f$. One potential difference comparing to the 3GPP Rel-16 Type II, which is to be discussed in 3GPP, is that We might be layer-common. The structure of $W_1$, $W_2$ will remain the same as described in 3GPP Rel-16 Type II.

Hence, several aspects of the configuring and reporting mechanism of the NR 3GPP Rel-17 Type II CSI report have not been defined in 3GPP, including configuring the number of selected CSI-RS ports and the network node configuring and wireless device reporting mechanism.

SUMMARY

Some embodiments advantageously provide methods, systems, and apparatuses for configuration and reporting scheme(s) such as for Third Generation Partnership Project (3GPP) Release 17 NR Type II (also referred to as Rel 17 NR Type II).

In one or more embodiments, for configuring the number of selected CSI-RS ports for the Rel-17 Type II port-selection (PS) codebook, a ratio is multiplied by the total number of CSI-RS ports to determine the number of selected CSI-RS ports.

In one or more embodiments, methods have also been proposed for configuring non-zero coefficient reporting for Rel-17 NR Type II PS codebook by jointly configuring CSI report parameters, such that the overhead for indicating the configuration is reduced. In addition, methods for wireless device reporting non-zero coefficients are also proposed, which improves the overhead and performance tradeoff of the Rel-17 NR Type II PS codebook.

According to one aspect of the present disclosure, a wireless device is configured to communicate with a network node that is implementing a plurality of Channel State Information-Reference Signal, CSI-RS, ports. The wireless device includes processing circuitry configured to: receive a configuration of a CSI-RS resource that is associated with the plurality of CSI-RS ports, determine at least a subset of the plurality of CSI-RS ports for performing a CSI-RS measurement within the CSI-RS resource where the determination is based on a calculation using a total number of the plurality of CSI-RS ports and a ratio value, and perform the CSI measurement based on the determined subset of the plurality of CSI-RS ports.

According to one or more embodiments of this aspect, the calculation corresponds to multiplying the total number of the plurality of CSI-RS ports by the ratio value. According to one or more embodiments of this aspect, the ratio value is greater 0 and less than or equal to 1. According to one or more embodiments of this aspect, the processing circuitry is further configured to determine a Pre-coding Matrix Indicator, PMI, based on the CSI measurement.

According to one or more embodiments of this aspect, the ratio value is indicated by higher layer signaling. According to one or more embodiments of this aspect, the processing circuitry is further configured to cause transmission of CSI feedback associated with the CSI measurement based on the determined subset of the plurality of CSI-RS ports. According to one or more embodiments of this aspect, the processing circuitry is further configured to: receive a configuration of a plurality of frequency domain, FD, basis vectors, select at least one FD basis vector from the plurality of FD basis vectors, quantize linear combination coefficients associated with the determined at least a subset of the plurality of CSI-RS ports and the selected at least one FD basis vector where the CSI feedback indicates the quantized linear combination coefficients.

According to another aspect of the present disclosure, a network node implementing a plurality of Channel State Information-Reference Signal, CSI-RS, ports is provided. The network node includes processing circuitry configured to: transmit a configuration of a CSI-RS resource, and receive CSI feedback based on a CSI measurement, where the CSI measurement is based on at least a subset of the plurality of CSI-RS ports within the CSI-RS resource, and where the at least the subset of the plurality of CSI-RS ports is based on a calculation using a total number of the plurality of CSI-RS ports and a ratio value.

According to one or more embodiments of this aspect, the calculation corresponds to multiplying the total number of the plurality of CSI-RS ports by the ratio value. According to one or more embodiments of this aspect, the ratio value is greater 0 and less than or equal to 1. According to one or more embodiments of this aspect, the CSI feedback includes a Pre-coding Matrix Indicator, PMI, that is based on the CSI measurement.

According to one or more embodiments of this aspect, the processing circuitry is further configured to cause transmission via higher layer signaling of an indication that indicates the ratio value. According to one or more embodiments of this aspect, the processing circuitry is further configured to cause transmission of a configuration of a plurality of frequency domain, FD, basis vectors where the CSI feedback indicates a quantized linear combination coefficients that are associated with the at least a subset of the plurality of CSI-RS ports and at least one FD basis vector.

According to another aspect of the present disclosure, a method implemented in a wireless device that is configured to communicate with a network node implementing a plurality of Channel State Information-Reference Signal, CSI-RS, ports is provided. A configuration of a CSI-RS resource that is associated with the plurality of CSI-RS ports is received. At least a subset of the plurality of CSI-RS ports for performing a CSI-RS measurement within the CSI-RS resource is determined where the determination is based on a calculation using a total number of the plurality of CSI-RS ports and a ratio value. The CSI measurement is performed based on the determined subset of the plurality of CSI-RS ports.

According to one or more embodiments of this aspect, the calculation corresponds to multiplying the total number of the plurality of CSI-RS ports by the ratio value. According to one or more embodiments of this aspect, the ratio value is greater 0 and less than or equal to 1. According to one or more embodiments of this aspect, a Pre-coding Matrix Indicator, PMI, is determined based on the CSI measurement.

According to one or more embodiments of this aspect, the ratio value is indicated by higher layer signaling. According to one or more embodiments of this aspect, transmission of CSI feedback associated with the CSI measurement is caused based on the determined subset of the plurality of CSI-RS ports. According to one or more embodiments of this aspect, a configuration of a plurality of frequency domain, FD, basis vectors are received. At least one FD basis vector from the plurality of FD basis vectors is selected. Linear combination coefficients associated with the determined at least a subset of the plurality of CSI-RS ports and the selected at least one FD basis vector are quantized. The CSI feedback indicates the quantized linear combination coefficients.

According to another aspect of the present disclosure, a method implemented by a network node that is implementing a plurality of Channel State Information-Reference Signal, CSI-RS, ports is provided. A configuration of a CSI-RS resource is transmitted. CSI feedback is received based on a CSI measurement where the CSI measurement is based on at least a subset of the plurality of CSI-RS ports within the CSI-RS resource, and where the at least the subset of the plurality of CSI-RS ports is based on a calculation using a total number of the plurality of CSI-RS ports and a ratio value.

According to one or more embodiments of this aspect, the calculation corresponds to multiplying the total number of the plurality of CSI-RS ports by the ratio value. According to one or more embodiments of this aspect, the ratio value is greater 0 and less than or equal to 1. According to one or more embodiments of this aspect, the CSI feedback includes a Pre-coding Matrix Indicator, PMI, that is based on the CSI measurement.

According to one or more embodiments of this aspect, transmission is caused via higher layer signaling of an indication that indicates the ratio value. According to one or more embodiments of this aspect, transmission is caused of a configuration of a plurality of frequency domain, FD, basis vectors where the CSI feedback indicates a quantized linear combination coefficients that are associated with the at least a subset of the plurality of CSI-RS ports and at least one FD basis vector.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a diagram of a procedure of codebook-based transmission for FDD with delay and angle reciprocity between uplink and downlink;

FIG. 9 is a flowchart illustrating example methods implemented in a communication system including a host computer, a network node and a wireless device for executing a client application at a wireless device according to some embodiments of the present disclosure;

FIG. 10 is a flowchart illustrating example methods implemented in a communication system including a host computer, a network node and a wireless device for receiving user data at a wireless device according to some embodiments of the present disclosure;

FIG. 13 is a flowchart of an example process in a network node according to some embodiments of the present disclosure;

FIG. 14 is a flowchart of another example process in a network node according to some embodiments of the present disclosure;

FIG. 15 is a flowchart of an example process in a wireless device according to some embodiments of the present disclosure;

DETAILED DESCRIPTION

Figure 1:
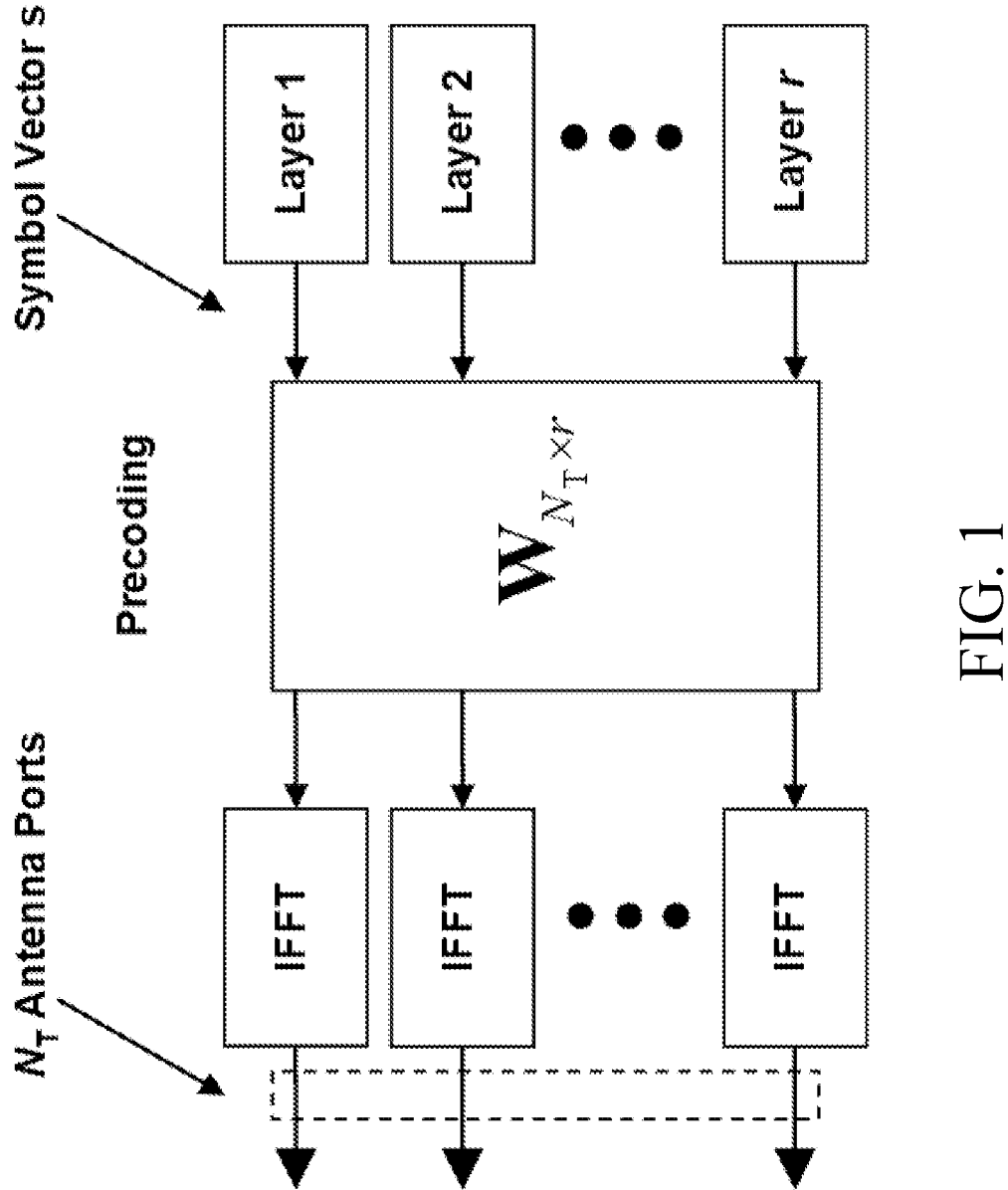
FIG. 1 is a diagram of a transmission structure of precoded spatial multiplexing mode in NR.
Figure 3:
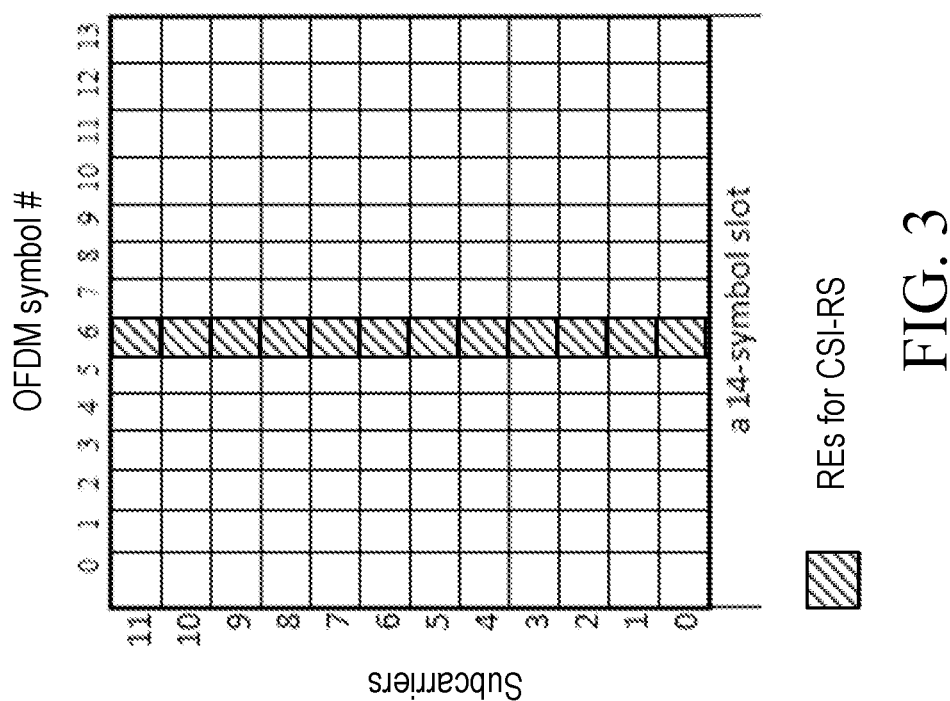
FIG. 3 is a diagram an example of RE allocation for a 12-port CSI-RS in NR.
Figure 2:
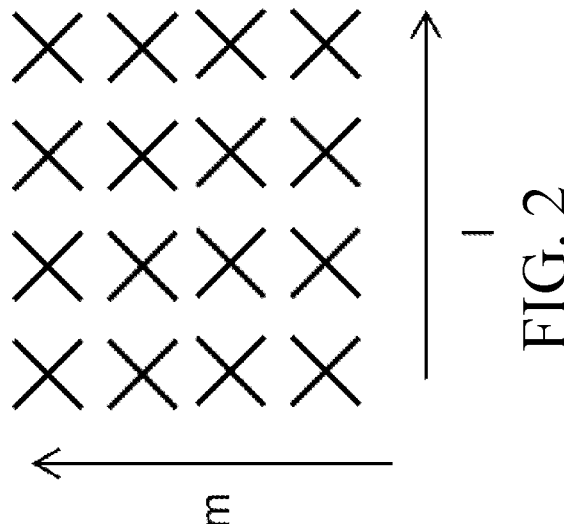
FIG. 2 is a diagram of a two-dimensional antenna array of dual-polarized antenna elements ($N_p$=2), with $N_h$=4 horizontal antenna elements and $N_v$=4 vertical antenna elements.
Figure 4:
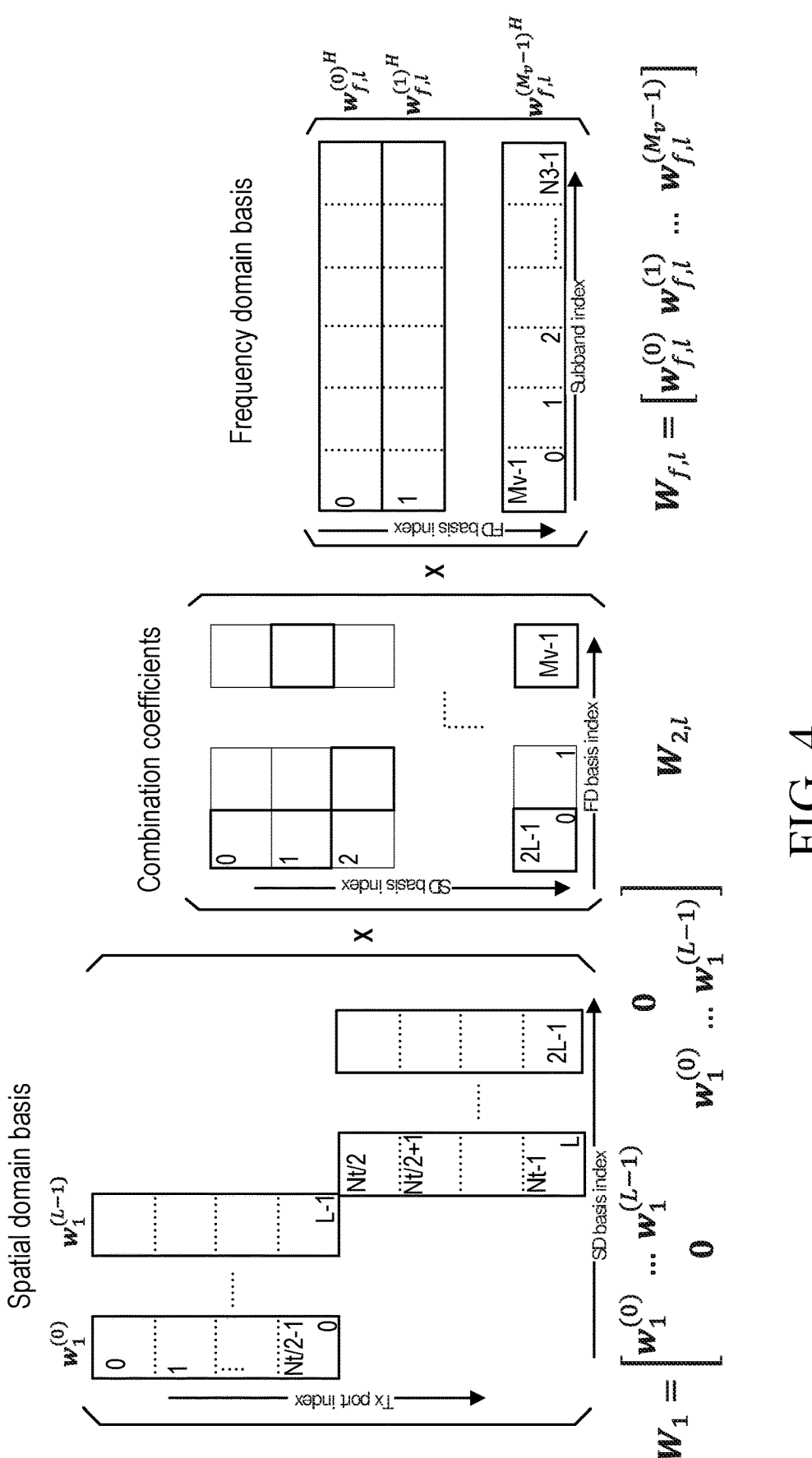
FIG. 4 is a diagram of a factorization of the Rel-16 Type II port-selection precoder for layer 1.
Figure 6:
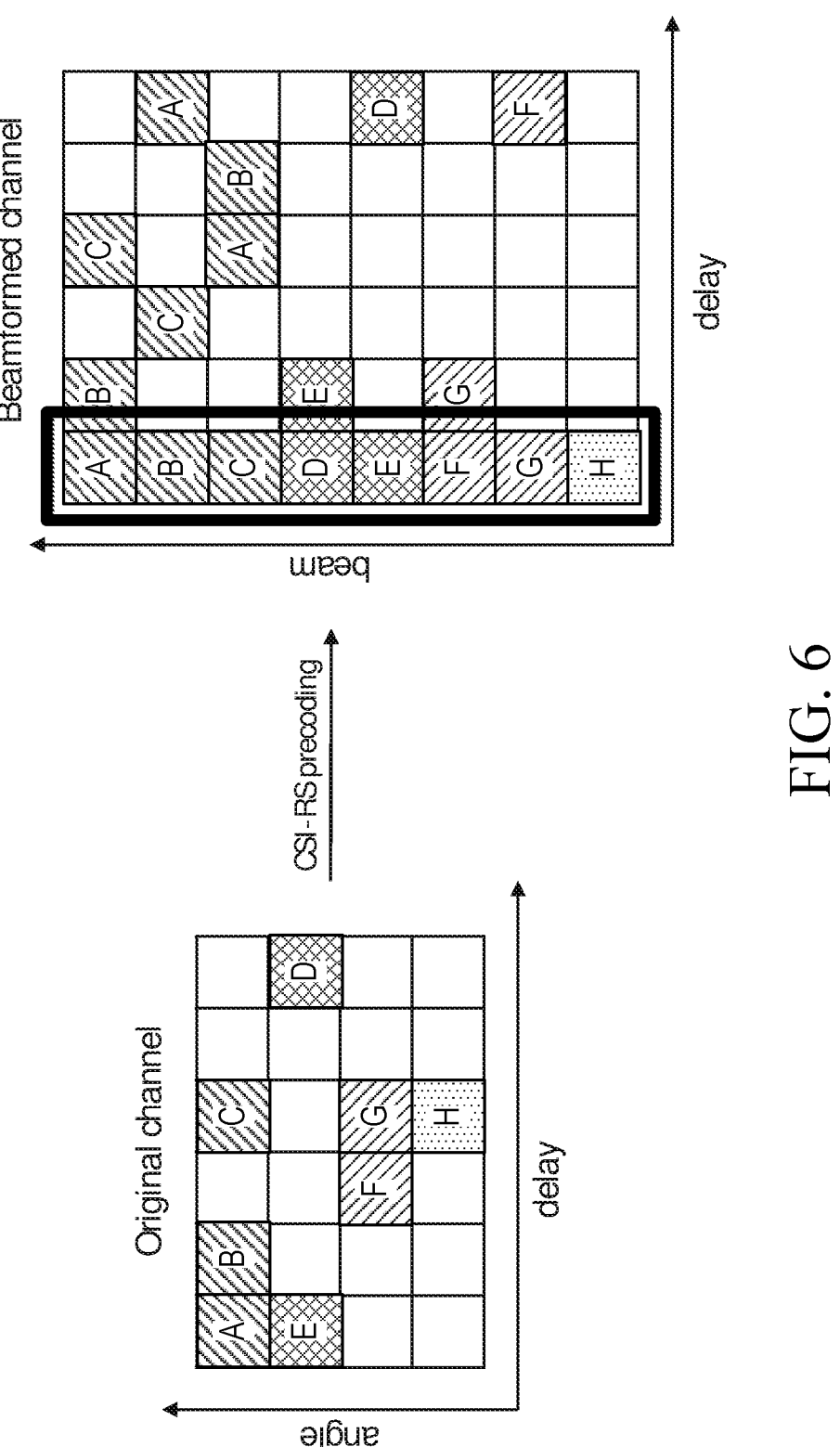
FIG. 6 is a diagram of an example of CSI-RS precoding and Type II PMI calculation based on angle-delay reciprocity.

Before describing in detail example embodiments, it is noted that the embodiments reside primarily in combinations of apparatus components and processing steps related to configuration and reporting scheme(s) such as for Rel 17 NR Type II.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the general description elements in the form of "one of A and B" corresponds to A or B. In some embodiments, at least one of A and B corresponds to A, B or AB, or to one or more of A and B. In some embodiments, at least one of A, B and C corresponds to one or more of A, B and C, and/or A, B, C or a combination thereof.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide configuration and reporting scheme(s) such as, for example, for Rel 17 NR Type II.

Figure 7:
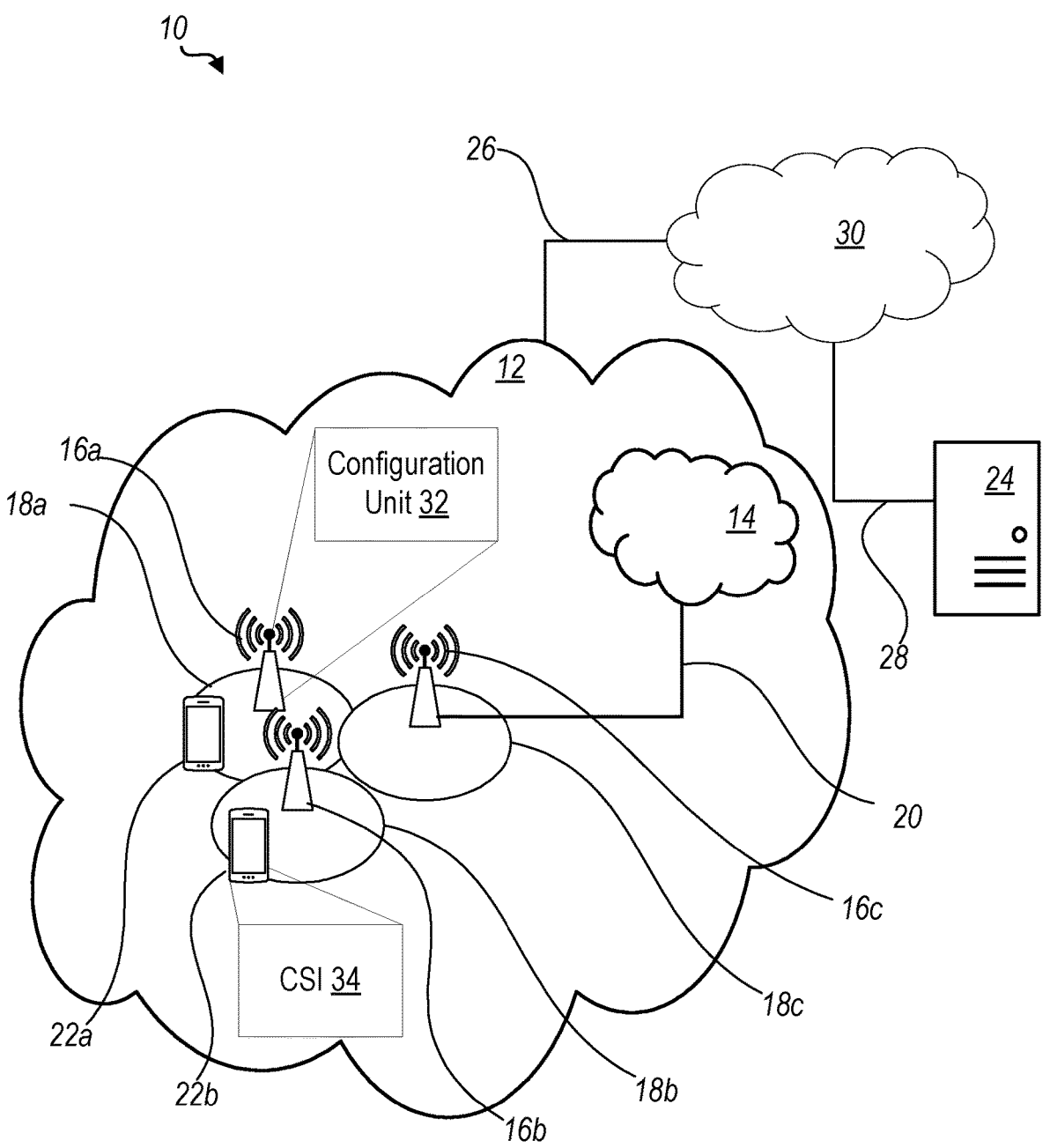
FIG. 7 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 7 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 7 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to perform one or more network node 16 functions as described herein such as with respect to configuration and reporting scheme(s) such as, for example, for Rel 17 NR Type II. A wireless device 22 is configured to include a CSI unit 34 which is configured to perform one or more wireless device 22 functions as described herein such as with respect to configuration and reporting scheme(s) such as, for example, for Rel 17 NR Type II.

Example implementations, in accordance with an embodiment, of the WD 22, network node 16 and host computer 24 discussed in the preceding paragraphs will now be described with reference to FIG. 8. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to analyze, determine, forward, relay, transmit, receive, store, etc., information related to configuration and reporting scheme(s) such as, for example, for Rel 17 NR Type II.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform one or more network node 16 functions as described herein such as with respect to configuration and reporting scheme(s) such as, for example, for Rel 17 NR Type II.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a CSI unit 34 configured to perform one or more wireless device 22 functions as described herein such as with respect to configuration and reporting scheme(s) such as, for example, for Rel 17 NR Type II.

Figure 8:
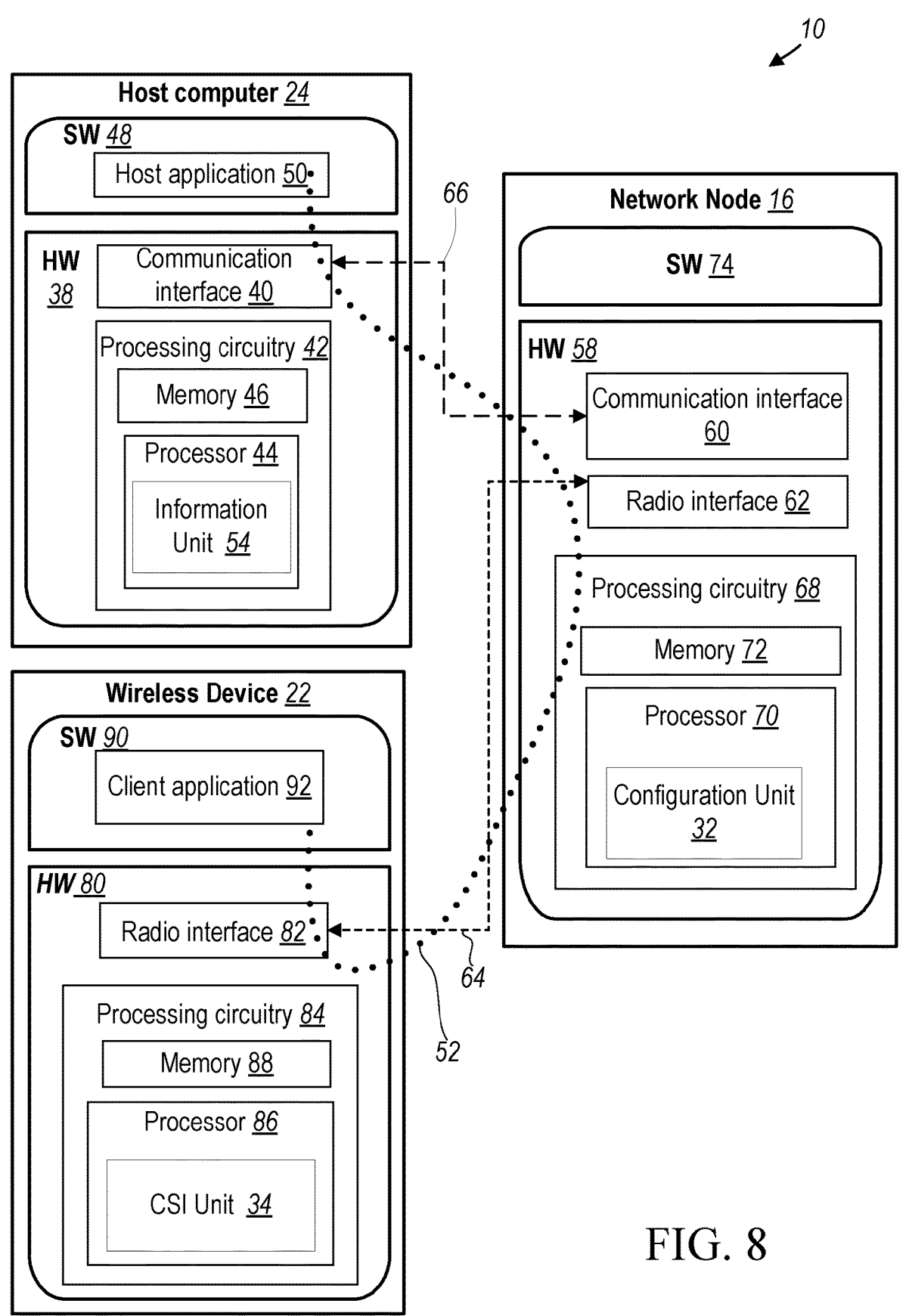
FIG. 8 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 8 and independently, the surrounding network topology may be that of FIG. 7.

In FIG. 8, the OTT connection 52 has been drawn abstractly to illustrate the communication between the host computer 24 and the wireless device 22 via the network node

16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 7 and 8 show various "units" such as configuration unit 32, and CSI unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 9 is a flowchart illustrating an example method implemented in a communication system, such as, for example, the communication system of FIGS. 7 and 8, in accordance with one embodiment. The communication system may include a host computer 24, a network node 16 and a WD 22, which may be those described with reference to FIG. 8. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 10 is a flowchart illustrating an example method implemented in a communication system, such as, for example, the communication system of FIG. 7, in accordance with one embodiment. The communication system may include a host computer 24, a network node 16 and a WD 22, which may be those described with reference to FIGS. 7 and 8. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 11, 12:
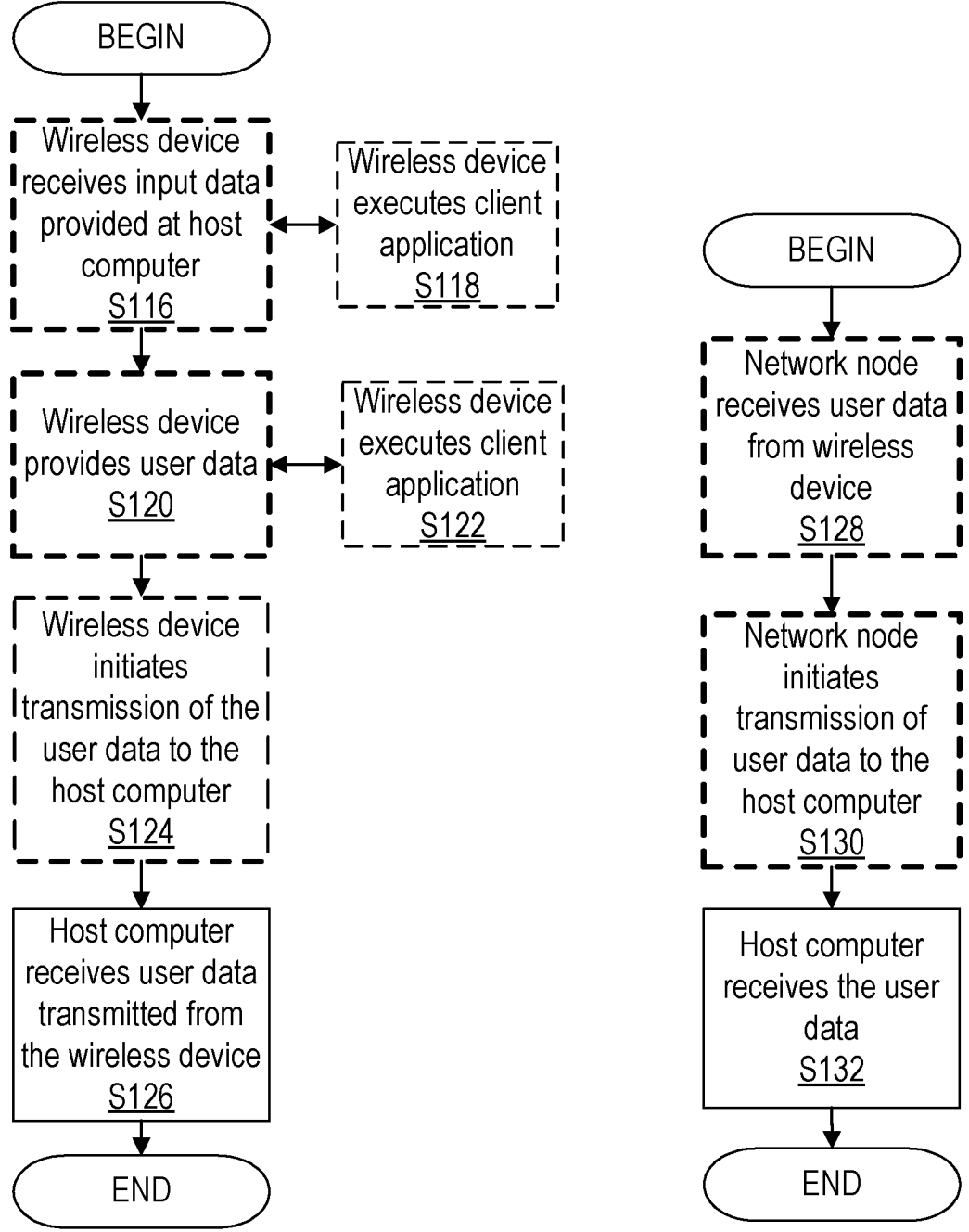
FIG. 11 is a flowchart illustrating example methods implemented in a communication system including a host computer, a network node and a wireless device for receiving user data from the wireless device at a host computer according to some embodiments of the present disclosure.
FIG. 12 is a flowchart illustrating example methods implemented in a communication system including a host computer, a network node and a wireless device for receiving user data at a host computer according to some embodiments of the present disclosure.

FIG. 11 is a flowchart illustrating an example method implemented in a communication system, such as, for example, the communication system of FIG. 7, in accordance with one embodiment. The communication system may include a host computer 24, a network node 16 and a WD 22, which may be those described with reference to FIGS. 7 and 8. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 12 is a flowchart illustrating an example method implemented in a communication system, such as, for example, the communication system of FIG. 7, in accordance with one embodiment. The communication system may include a host computer 24, a network node 16 and a WD 22, which may be those described with reference to FIGS. 7 and 8. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 13 is a flowchart of an example process in a network node 16 for according to some embodiments of the present disclosure. One or more blocks described herein may be performed by one or more elements of network node 16 such as by one or more of processing circuitry 68 (including the configuration unit 32), processor 70, radio interface 62 and/or communication interface 60. Network node 16 select (Block S134) at least a subset of a plurality of channel state information-reference signal, CSI-RS, ports for channel measurements where a quantity of the subset of the plurality of CSI-RS ports that is selected is based at least on a total quantity of the plurality of CSI-RS ports, as described herein. Network node 16 is configured to cause (Block S136) transmission of a configuration for performing CSI measurements on CSI-RS resources associated with the selection of at least the subset of the plurality of CSI-RS ports, as described herein.

According to one or more embodiments, the quantity of the subset of the plurality of CSI-RS ports that is selected is based at least on a parameter $\beta$ whose value is one of signaled to the wireless device 22 and assumed by the wireless device 22. According to one or more embodiments, the parameter $\beta$ is equal to 1 such as to configure the wireless device 22 to report all coefficients associated with the selected at least a subset of the plurality of CSI-RS ports. According to one or more embodiments, the coefficients are non-zero coefficients.

According to one or more embodiments, the quantity of the subset of the plurality of CSI-RS ports that is selected is configured to be based on a ratio parameter $\alpha$ and a quantity of the plurality of CSI-RS ports. According to one or more embodiments, the ratio parameter $\alpha$ is equal to 1. According to one or more embodiments, the configuration is transmitted via higher layer signaling. According to one or more embodiments, the configuration is a 3GPP Rel 17 Type II configuration.

FIG. 14 is a flowchart of another example process in a network node 16 according to some embodiments of the present disclosure. One or more blocks described herein may be performed by one or more elements of network node 16 such as by one or more of processing circuitry 68 (including the configuration unit 32), processor 70, radio interface 62 and/or communication interface 60. Network node 16 is configured to transmit (Block S138) a configuration of a CSI-RS resource, as described herein. Network node 16 is configured to receive (Block S140) CSI feedback based on a CSI measurement where the CSI measurement is based on at least a subset of the plurality of CSI-RS ports within the CSI-RS resource, and where the at least the subset of the plurality of CSI-RS ports is based on a calculation using a total number of the plurality of CSI-RS ports and a ratio value, as described herein.

According to one or more embodiments, the calculation corresponds to multiplying the total number of the plurality of CSI-RS ports by the ratio value. According to one or more embodiments, the ratio value is greater 0 and less than or equal to 1. According to one or more embodiments, the CSI feedback includes a Pre-coding Matrix Indicator, PMI, that is based on the CSI measurement. According to one or more embodiments, the processing circuitry is further configured to cause transmission via higher layer signaling of an indication that indicates the ratio value.

According to one or more embodiments, the processing circuitry 68 is further configured to cause transmission of a configuration of a plurality of frequency domain, FD, basis vectors, where the CSI feedback indicates a quantized linear combination coefficients that are associated with the at least a subset of the plurality of CSI-RS ports and at least one FD basis vector.

FIG. 15 is a flowchart of an example process in a wireless device 22 according to some embodiments of the present disclosure. One or more blocks described herein may be performed by one or more elements of wireless device 22 such as by one or more of processing circuitry 84 (including the CSI unit 34), processor 86, radio interface 82 and/or communication interface 60. Wireless device 22 is configured to receive (Block S142) a configuration for performing channel state information, CSI, measurements on CSI-reference signal, RS, resources associated with a selection of at least a subset of a plurality of CSI-RS ports where a quantity of the subset of the plurality of CSI-RS ports that is selected is based at least on a total quantity of the plurality of CSI-RS ports, as described herein. Wireless device 22 is configured to perform (Block S144) CSI measurements based at least on the received configuration, as described herein. Wireless device 22 is configured to cause (Block S146) transmission of a CSI report based at least on the CSI measurements, as described herein.

According to one or more embodiments, the quantity of the subset of the plurality of CSI-RS ports that is selected is based at least on a parameter β where a value for parameter β is one of received and assumed by the wireless device 22. According to one or more embodiments, the parameter β is equal to 1 such as to configure the wireless device 22 to report all coefficients associated with the selected at least a subset of the plurality of CSI-RS ports. According to one or more embodiments, the coefficients are non-zero coefficients.

According to one or more embodiments, the quantity of the subset of the plurality of CSI-RS ports that is selected is configured to be based on a ratio parameter α and a quantity of the plurality of CSI-RS ports. According to one or more embodiments, the ratio parameter α is equal to 1. According to one or more embodiments, the processing circuitry is further configured to receive the configuration via higher layer signaling. According to one or more embodiments, the configuration is a Rel 17 Type II configuration.

Figure 16:
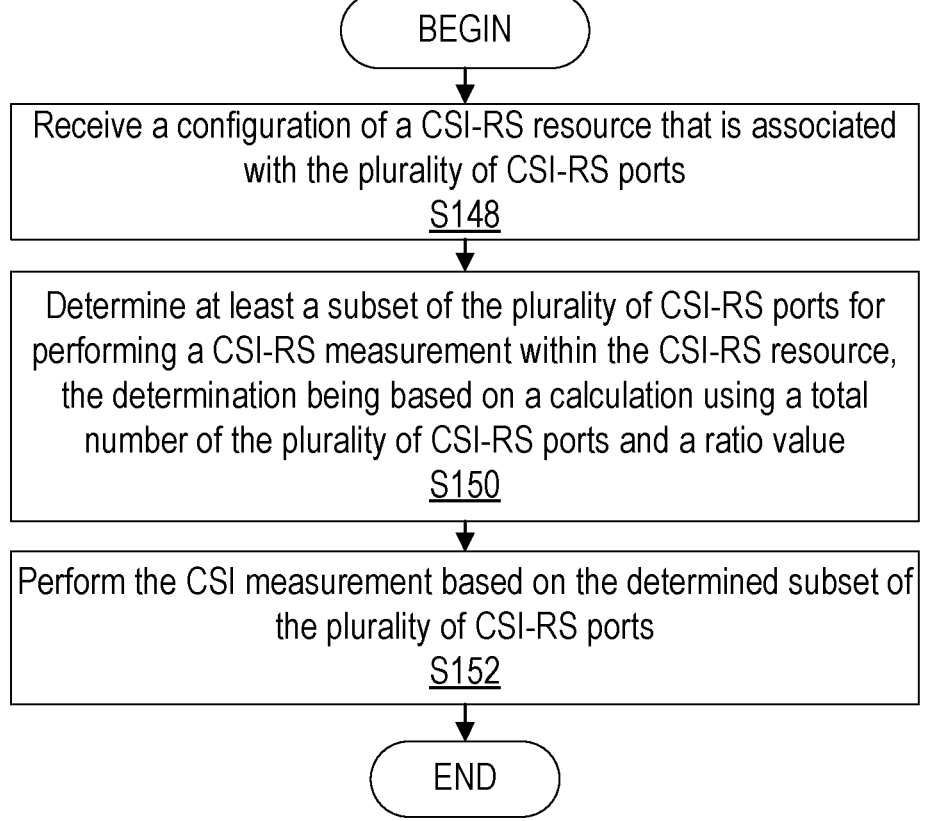
FIG. 16 is a flowchart of another example process in a wireless device according to some embodiments of the present disclosure.

FIG. 16 is a flowchart of an example process in a wireless device 22 according to some embodiments of the present disclosure. In one or mor embodiments, wireless device 22 is in communication with network node 16 that implements a plurality of CSI-RS ports. One or more blocks described herein may be performed by one or more elements of wireless device 22 such as by one or more of processing circuitry 84 (including the CSI unit 34), processor 86, radio interface 82 and/or communication interface 60. Wireless device 22 is configured to receive (Block S148) a configuration of a CSI-RS resource that is associated with the plurality of CSI-RS ports, as described herein. Wireless device 22 is configured to determine (Block S150) at least a subset of the plurality of CSI-RS ports for performing a CSI-RS measurement within the CSI-RS resource where the determination is based on a calculation using a total number of the plurality of CSI-RS ports and a ratio value. Wireless device 22 is configured to perform (Block S152) the CSI measurement based on the determined subset of the plurality of CSI-RS ports, as described herein.

According to one or more embodiments, the calculation corresponds to multiplying the total number of the plurality of CSI-RS ports by the ratio value. According to one or more embodiments, the ratio value is greater 0 and less than or equal to 1. According to one or more embodiments, the processing circuitry is further configured to determine a Pre-coding Matrix Indicator, PMI, based on the CSI measurement. According to one or more embodiments, the ratio value is indicated by higher layer signaling.

According to one or more embodiments, the processing circuitry 84 is further configured to cause transmission of CSI feedback associated with the CSI measurement based on the determined subset of the plurality of CSI-RS ports. According to one or more embodiments, the processing circuitry is further configured to: receive a configuration of a plurality of frequency domain, FD, basis vectors, select at least one FD basis vector from the plurality of FD basis vectors, and quantize linear combination coefficients associated with the determined at least a subset of the plurality of CSI-RS ports and the selected at least one FD basis vector, where the CSI feedback indicating the quantized linear combination coefficients.

Having generally described arrangements for configuration and reporting scheme(s) such as for Rel 17 NR Type II, details for these arrangements, functions and processes are provided as follows, and which may be implemented by the network node 16, wireless device 22 and/or host computer 24.

Some embodiments provide configuration and reporting scheme(s) such as for Rel 17 NR Type II. One or more network node 16 functions described below may be performed by one or more of processing circuitry 68, processor 70, configuration unit 32, radio interface 62, etc. One or more wireless device 22 functions described below may be performed by one or more of processing circuitry 84, processor 86, CSI unit 34, radio interface 82, etc.

Configuring the Number (Quantity) of Selected CSI-RS Ports at Network Node 16:

Denote the total number (i.e., quantity) of CSI-RS ports associated with a configured CSI-RS resource for channel measurement as P, and the number of selected/reported CSI-RS ports as L. In 3GPP Rel-16 Type II. L can be selected and configured from a few fixed values, e.g., 2, 4, 6, hence L has no dependency on P. This could be a viable solution for Rel-16 Type II, since each selected port in 3GPP Rel-16 Type II corresponds to a dominant spatial direction, and the number of dominant spatial directions can be limited. In 3GPP Rel-17 Type II, however, each port is associated with a pair of spatial domain (SD) basis and a frequency domain (FD) basis, such that it can happen that a few ports are associated with the same spatial direction, but with different delays. In light of this, many more CSI-RS ports may need to be selected to guarantee the 3GPP Rel-17 Type II to work. Moreover, the number of selected CSI-RS ports, L, scales with P, since when a larger P is configured, it is expected that there are also a larger number of dominant angle-delay pairs (each corresponding to a dominant cluster with a strong tap). If directly extending the legacy (i.e., Rel 16) setting by allowing more candidate L values, the configuration overhead can be large.

Figure 17:
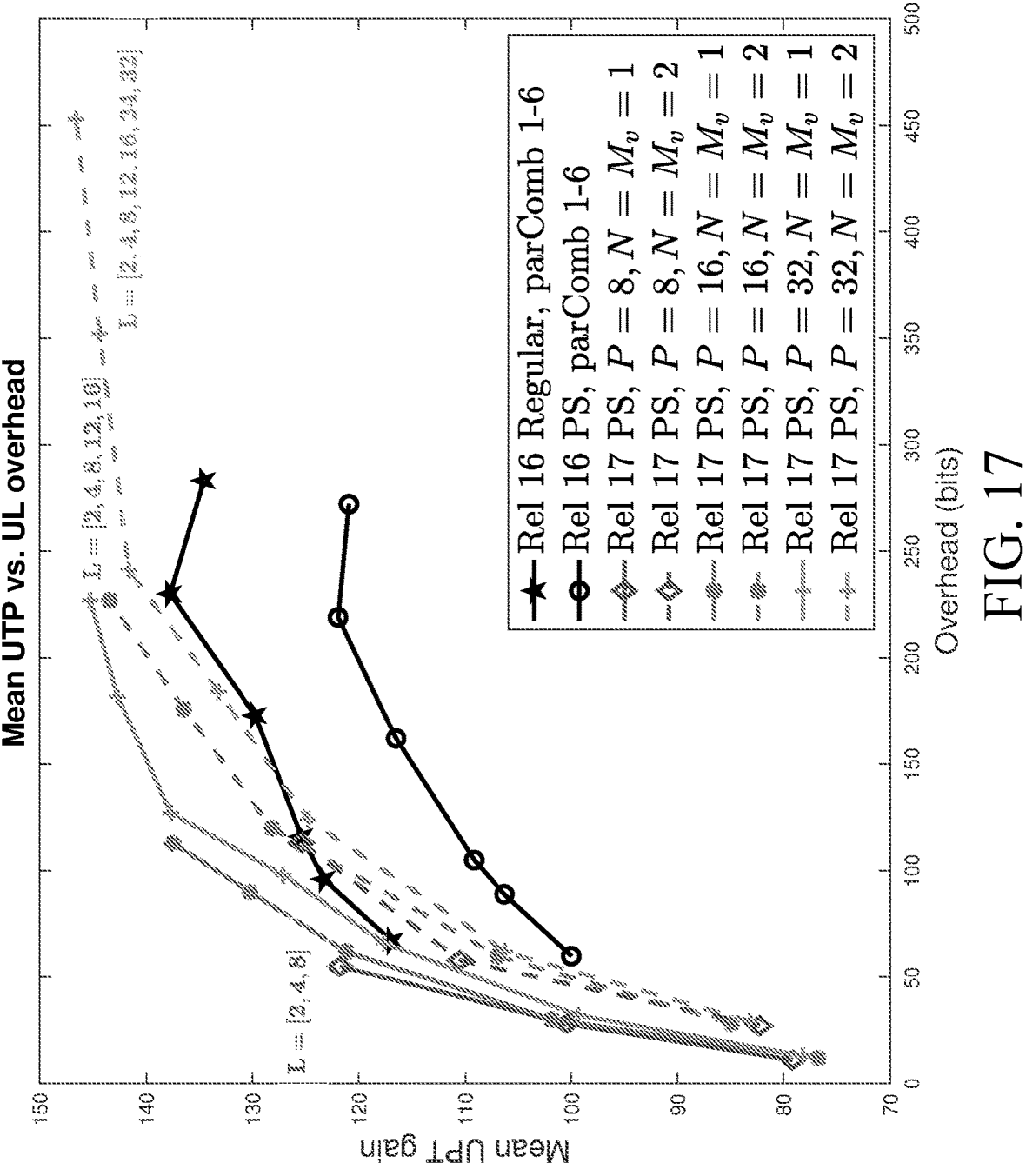
FIG. 17 is a diagram of mean user throughput vs. UL overhead for different values of P, L.

In the example graph of FIG. 17, the mean user throughput (UTP) is compared for different values of P and L, for $N=M_v=1$ and $N=M_v=2$, where N and $M_v$ are the number of configured and selected FD basis vectors. Each point on the colored curve corresponds to a pair of P and L values. It is observed that when the number of CSI-RS ports is 8 or 16, having L=P gives decent gain comparing to selecting, for example, half of the ports. In fact, having small value of $K_1$ comparing to P introduces significant UTP drop. From this result, it is determined that the value of $K_1$ should be comparable with the value of P to guarantee a good performance by 3GPP Rel-17 Type II. Based on the above reasoning, a ratio, for example denoted by $0 \leq \alpha \leq 1$, can be used to determine the value of L for a given value of P.

In one embodiment, the value of L is configured and determined via a ratio $0 \leq \alpha \leq 1$ and P. To be more specific, $L=\lceil \alpha P \rceil$, where $\lceil . \rceil$ is the ceiling operator.

Denote the number of candidate $\alpha$ values as K, then $\alpha$ can be encoded $\lceil \log_2^K \rceil$ bits. For example, if candidate $\alpha$ values are 1, 0.9, 0.8 and 0.7, then 2 bits "11" can be used for $\alpha=1$, "10" for $\alpha=0.9$, "01" for $\alpha=0.8$ and "00" for 0.7.

In another embodiment, the value of $\alpha$ can be encoded in bit fields. In another embodiment, the bit field for $\alpha$ is configured to wireless device 22 via higher layer signaling (e.g., RRC). In another embodiment, the value of $\alpha$ is configured to wireless device 22 via higher layer signaling (e.g., RRC)

Configuring and Reporting Non-Zero Coefficients

Network node 16 configuration and wireless device 22 reporting mechanism for reporting the non-zero coefficients in 3GPP Rel-17 NR Type II port-selection (PS) CB can be optimized for the FDD-based reciprocity operation.

In 3GPP Rel 16 Type II, the configured codebook parameter $\beta$ is a ratio that controls the maximum number of non-zero coefficients (NZCs) that can be reported by wireless device 22 to network node 16, where each reported NZC is associated with a certain port (or spatial-domain (SD) basis) and a certain frequency-domain (FD) basis.

The interpretation of NZC in physical terms is as follows: The association of an NZC and the corresponding port (or SD basis) and FD basis reflects the presence of a dominant scattering cluster in the propagation channel, as the selected port (or SD basis) and FD basis can be translated to the spatial direction and the delay to that cluster in that direction, respectively. If the channel is very rich with many such clusters, the NZC can be large.

The mechanism of 3GPP Rel-16 Type II configuration was designed without the assumption that network node 16 is performing delay pre-compensation during CSI-RS precoding. As a result, wireless device 22 usually observes a frequency selective DL channel when measuring the channel for a port, meaning that for different ports (or spatial bases), the delays associated with the corresponding ports (or spatial bases) are different.

Since a port-common FD basis is used in 3GPP Rel-16 Type II, it results in that some of the coefficients in $W_2$ are always quite small and can be set to zero (i.e., no need to report them). Based on the above reasoning, $\beta$ is always smaller than 1, in fact, candidate values of $\beta$ in Rel-16 Type II are 0.25, 0.5 and 0.75.

In 3GPP Rel-17 Type II, however, delay(s) for each selected clusters is (are) pre-compensated by network node 16, and wireless device 22 can filter out a small number of delay taps (taps are identified either by network node 16 configuration or wireless device 22 selection, or a combination) to preserve most of the channel knowledge, based on which wireless device 22 can calculate the Rel-17 Type II report. Ideally, a single tap would be sufficient, if network node 16 pre-compensation is perfect and the channel does not have any delay spread.

It is noted that the direct re-use of the 3GPP Rel-16 Type II reporting of NZC would lead to an inefficient use of signaling. One or more embodiments described herein take advantage of network side delay pre-compensation in 3GPP Rel-17 Type II, to enhance the mechanisms of network node 16 configuring and wireless device 22 reporting of non-zero coefficients so that performance can be improved and CSI reporting is more efficient and optimized with respect to reporting overhead.

Wireless Device 22 Configuration by the Network Node 16 (e.g., gNB) Using Higher Layer Signaling (e.g., RRC):

Despite small scale fast fading which is non-reciprocal or non-ideal delay reciprocity between UL and DL, for CSI-RS precoding design, the best or the most reasonable a network node can do is to select only dominant clusters that are observed through UL channel measurement, and precodes CSI-RS towards the selected clusters.

In other words, all the clusters that are selected for CSI-RS precoding may be observed as strong in UL. For rank 1 transmission, since all the clusters are used for the same transmission layer, network node 16 can expect that all the selected clusters, each associated with a coefficient in W2, are strong.

This means that network node 16 may always configure the wireless device 22 with $\beta=1$ (or alternatively, with all port reporting, where all port reporting means that wireless device 22 reports all coefficients associated with all selected ports) when wireless device 22 is assuming rank-1 CSI reporting (i.e., the rank indicator (RI) is 1). Wireless device 22 may autonomously have decided on rank 1 reporting, or network node 16 has configured wireless device 22 to report rank 1 (using a rank restriction configured by higher layers). The overhead for configuring a single value of $\beta=1$ or all port reporting can be reduced compared to allowing multiple $\beta$ values.

In one embodiment, for 3GPP Rel-17 Type II configuration, wireless device 22 is always configured with $\beta=1$ or is always configured with all port reporting for rank 1 CSI reporting.

In another embodiment, for 3GPP Rel-17 Type II configuration, the parameter $\beta$ is not configured, instead wireless device 22 assumes $\beta=1$ or assumes all port reporting for rank 1 CSI reporting.

In another embodiment, for 3GPP Rel-17 Type II configuration, the parameter $\beta$ is configured, but irrespective of what is configured, wireless device 22 assumes $\beta=1$ or all port reporting for the case of rank 1 CSI reporting.

Figure 18:
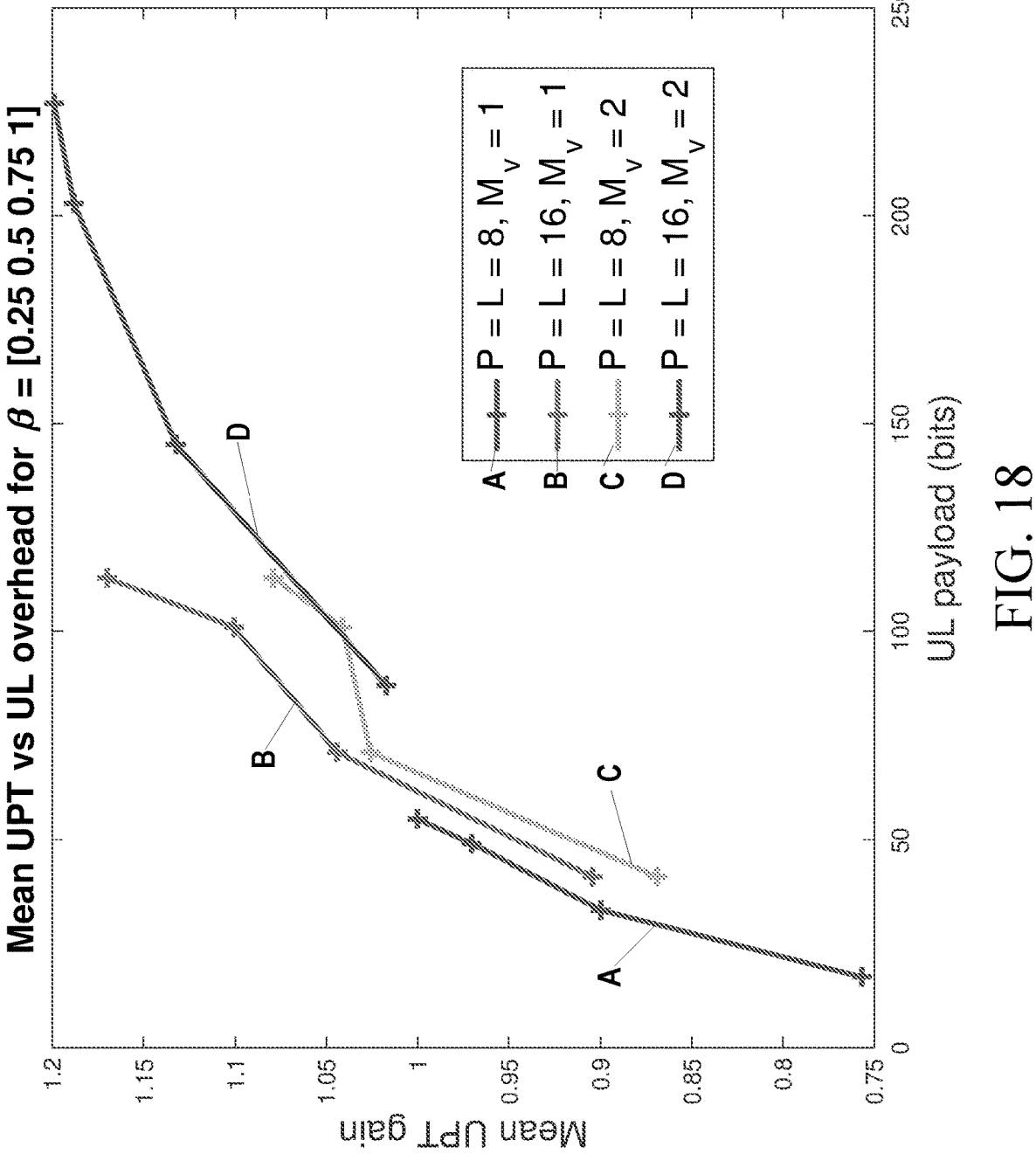
FIG. 18 is a diagram of mean user throughout vs UL overhead for Rel-17 NR Type II with different β values.

Wireless Device 22 Reporting of CSI to the Network:

Wireless device 22 reporting of CSI can be optimized/ simplified when it is configured/assumed with β=1 or all port reporting for rank 1 transmission. In FIG. 18, mean user throughput (UTP) is plotted against UL overhead for β=0.25, 0.5, 0.75 and 1. The four curves correspond to different number of precoded CSI-RS ports (P), number of selected ports (L) and FD basis vectors $M_v$. Comparing β=1 to β=0.75, it is observed that there is still a decent gain by having β=1 with small increase in UL overhead. This is due to that, in this simulation, it is assumed that all coefficients in $W_2$ are reported when β=1, so there is no need for reporting a bitmap. The saved bits from reporting bitmap can advantageously be used to report more coefficients, which further improves the performance, without introducing much additional overhead In one embodiment, for rank 1 transmission, wireless device 22 always reports all coefficients associated with the selected ports.

Wireless Device 22 Reporting with Rank Adaptation

Wireless device 22 may perform rank selection for the CSI report.

If wireless device 22 reports CSI with a rank larger than one, then NZC may be reported using a bitmap (i.e., a subset of ports) if beta=1, while for rank=1, wireless device 22 always reports all ports, so no bitmap to select NZC ports is reported.

SOME EXAMPLES

Examples of Wireless Device 22 Reporting of NZCs to Network Node 16

Example A1. A method, performed by a wireless device 22 for CSI feedback, the method including at least one of the following:

Receiving a configuration of a CSI-RS resource from a network node 16 with a plurality of CSI-RS ports.

Receiving a configuring/configuration and/or CSI report request from the network node 16 for CSI feedback using Rel-17 NR Type II port-selection (PS) codebook and where the wireless device performs CSI measurements on the configured CSI-RS resource.

Receiving a configuring of a set of frequency domain (FD) basis vectors.

Computing the content to be fed back in the CSI report, where, optionally, the computing includes at least one of the following steps:

Selecting a subset of, or the full set of configured CSI-RS ports in the CSI-RS resource.

Selecting a subset of, or the full set from the configured frequency domain (FD) basis vectors or selecting a subset of FD basis vectors freely from a DFT basis matrix.

Computing and quantizing linear combination coefficients corresponding to selected CSI-RS ports and FD basis vectors.

Transmitting a CSI report message including at least one of the following:

The selected subset or full set of CSI-RS ports of the configured CSI-RS resource.

The selected subset or full set of FD basis vectors from the configured FD basis vectors or the selected subset of FD basis vectors from a DFT basis matrix.

The corresponding linear combination coefficients associated with the selected CSI-RS ports and selected FD basis vectors are reported including quantized coefficients and indication of strongest coefficient.

Where, optionally, for rank 1 CSI reporting, wireless device 22 always reports all linear combination coefficients associated with the selected CSI-RS ports in the configured CSI-RS resource and selected FD basis vectors. One or more steps in Example 1 may be optional.

Example A2. The method of Example A1, wherein the wireless device 22 is configured with $M_1$=1, where $M_1$=1 is the number of selected FD basis for layer-1, the wireless device 22 always reports all linear combination coefficients associated with the selected CSI-RS ports in the configured CSI-RS resource and selected FD basis vectors.

Example A3. The method of Example A1, where the wireless device 22 is configured with $M_1$>1, the wireless device 22 always reports all linear combination coefficients associated with the selected CSI-RS ports in the configured CSI-RS resource and selected FD basis vectors.

Example A4. The method of any of Examples A1-A3, where the wireless device 22 is configured with P=L, the wireless device 22 always reports all linear combination coefficients associated with the CSI-RS ports in the configured CSI-RS resource and selected FD basis vectors.

Example A5. The method of any of Examples A1-A3, wherein the wireless device 22 is configured with P>L, the wireless device 22 always reports all linear combination coefficients associated with the selected CSI-RS ports in the configured CSI-RS resource and selected FD basis vectors.

Example A6. The method of any of Examples A1-A5, wherein the wireless device 22 is configured with β=1, the wireless device 22 always reports all linear combination coefficients associated with the selected CSI-RS ports in the configured CSI-RS resource and selected FD basis vectors.

Examples of Network Node 16 Configuration and CSI Calculation

Example B1. A method, performed by a network node 16 for transmitting to a wireless device 22 the information about Rel-17 Type II CSI report configuration, where β, the ratio of reported non-zero linear combination coefficients, is set to 1 when transmission rank is 1.

Example B2. The method of Example B1, wherein β=1 and rank indicator (RI)=1 are jointly configured with codebook parameter combination.

Example B3. The method of Example B1, wherein the configuring of β=1 is always configured when the CSI report configuration contains a CodebookConfig information element that restricts the transmission rank to be 1. Examples B2 and/or B3 may be optional.

Example B4. A method, performed by a network node 16 for calculating the channel state information based on a Rel-17 Type II CSI report.

Example B5. The method of Example B4, wherein if RI equals 1 in the received CSI report, network node 16 always assumes that all the configured CSI-RS ports are selected.

Example B6. A method, performed by a network node 16, for calculating CSI based on the received Rel-17 Type II report, where if RI equals 1, network node 16 always assumes that all the linear combination coefficients associated with the selected CSI-RS ports are non-zero, or in other words, the bitmap is with all ones.

Example B7. The method of Example B6, where the total number of non-zero coefficients, $N_{tot,NZ}$ equals the number of selected CSI-RS ports L, times the number of selected FD basis vectors for layer 1, $M_1$, i.e., $N_{tot,NZ}$=$LM_1$. Examples B6 and/or B7 may be optional.

Examples of Network Node 16 Configuration of the Number of Selected Ports

Example C1. A method, performed by a network node 16, for transmitting to a wireless device 22 the information about 3GPP Rel-17 Type II CSI report configuration, wherein L, the number of selected CSI-RS ports, is configured to the wireless device 22 via a ratio $0 \le \alpha \le 1$.

Example C2. The method of Example C1, wherein the ratio $\alpha$ is configured with a bit field, and signaled to the wireless device 22 via higher layer signaling, e.g., RRC.

Example C3. The method of Example C1, wherein the ratio $\alpha$ is directly configured, and signaled to the wireless device 22 via higher layer signaling, e.g., RRC. Examples C2 and/or C3 may be optional.

Examples of Wireless Device 22 Calculating the Number of Selected CSI-RS Ports Example D1. A method, performed by a wireless device 22, for determining the number of selected CSI-RS ports within the configured CSI-RS resource, L, the method includes at least one of the following:

Receiving a configuration of a CSI-RS resource from a network node 16 with a plurality of CSI-RS ports.

Receiving a configuring and/or CSI report request from the network node 16 for CSI feedback using Rel-17 NR Type II port-selection (PS) codebook and where the wireless device 22 performs CSI measurements on the configured CSI-RS resource.

Receiving a ratio $0 \le \alpha \le 1$ for determining the number of selected CSI-RS ports, LOr receiving a bit field from which the value of a can be inferred.

Where, optionally, L is calculated as $L = \lceil \alpha P \rceil$, where P is the number of CSI-RS ports in the configured CSI-RS resource, and $\lceil . \rceil$ is the ceiling operator Hence, regarding configuring the number of selected CSI-RS ports, one or more embodiments described here describe that the number of selected CSI-RS ports is determined by multiplying the total number of CSI-RS ports in the associated measured CSI-RS resource with a ratio, e.g., $0 \le \alpha \le 1$.

In one or more embodiments for reporting NZCs, when the wireless device 22 reports rank 1 to the network node 16, when Rel 17 Type II codebook has been configured, then the report includes coefficients associated with all selected ports. Hence, there is no reporting of a subset of NZC as all ports are reported (all ports are NZC).

One or more embodiment described herein provides one or more methods for network node configuration that reduces configuration overhead and for wireless device 22 reporting that improves performance and overhead tradeoff, for the 3GPP Rel 17 (Rel 17) CSI configuring and reporting mechanism.

SOME OTHER EXAMPLES

Example E1. A network node 16 configured to communicate with a wireless device 22 (WD 22), the network node 16 configured to, and/or comprising a radio interface 62 and/or comprising processing circuitry 68 configured to:

select at least a subset of a plurality of channel state information-reference signal, CSI-RS, ports for channel measurements, a quantity of the subset of the plurality of CSI-RS ports that is selected is based at least on a total quantity of the plurality of CSI-RS ports; and cause transmission of a configuration for performing CSI measurements on CSI-RS resources associated with the selection of at least the subset of the plurality of CSI-RS ports.

Example E2. The network node 16 of Example E1, wherein the quantity of the subset of the plurality of CSI-RS ports that is selected is based at least on a parameter $\beta$ whose value is one of signaled to the wireless device 22 and assumed by the wireless device 22.

Example E3. The network node 16 of Example E2, wherein the parameter $\beta$ is equal to 1 such as to configure the wireless device 22 to report all coefficients associated with the selected at least a subset of the plurality of CSI-RS ports.

Example E4. The network node 16 of Example E3, wherein the coefficients are non-zero coefficients.

Example E5. The network node 16 of Example E1, wherein the quantity of the subset of the plurality of CSI-RS ports that is selected is configured to be based on a ratio parameter $\alpha$ and a quantity of the plurality of CSI-RS ports.

Example E6. The network node 16 of Example E5, wherein the ratio parameter $\alpha$ is equal to 1.

Example E7. The network node 16 of any one of Examples E1-E6, wherein the configuration is transmitted via higher layer signaling.

Example E8. The network node 16 of any one of Examples E1-E7, wherein the configuration is a Rel 17 Type II configuration.

Example F1. A method implemented in a network node 16 that is configured to communicate with a wireless device 22, the method comprising:

selecting at least a subset of a plurality of channel state information-reference signal, CSI-RS, ports for channel measurements, a quantity of the subset of the plurality of CSI-RS ports that is selected is based at least on a total quantity of the plurality of CSI-RS ports; and causing transmission of a configuration for performing CSI measurements on CSI-RS resources associated with the selection of at least the subset of the plurality of CSI-RS ports.

Example F2. The method of Example F1, wherein the quantity of the subset of the plurality of CSI-RS ports that is selected is based at least on a parameter $\beta$ whose value is one of signaled to the wireless device and assumed by the wireless device 22.

Example F3. The method of Example F2, wherein the parameter $\beta$ is equal to 1 such as to configure the wireless device 22 to report all coefficients associated with the selected at least a subset of the plurality of CSI-RS ports.

Example F4. The method of Example F3, wherein the coefficients are non-zero coefficients.

Example F5. The method of Example F1, wherein the quantity of the subset of the plurality of CSI-RS ports that is selected is configured to be based on a ratio parameter $\alpha$ and a quantity of the plurality of CSI-RS ports.

Example B6. The method of Example B5, wherein the ratio parameter $\alpha$ is equal to 1.

Example F7. The method of any one of Examples F1-F6, wherein the configuration is transmitted via higher layer signaling.

Example F8. The method of any one of Examples F1-F7, wherein the configuration is a 3GPP Rel 17 Type II configuration.

Example G1. A wireless device 22 (WD 22) configured to communicate with a network node 16, the WD 22 configured to, and/or comprising a radio interface 82 and/or processing circuitry 84 configured to:

receive a configuration for performing channel state infor-
mation, CSI, measurements on CSI-reference signal,
RS, resources associated with a selection of at least a
subset of a plurality of CSI-RS ports, a quantity of the
subset of the plurality of CSI-RS ports that is selected
being based at least on a total quantity of the plurality
of CSI-RS ports;

perform CSI measurements based at least on the received
configuration; and cause transmission of a CSI report based at least on the
CSI measurements.

Example G2. The WD 22 of Example G1, wherein the
quantity of the subset of the plurality of CSI-RS ports that
is selected is based at least on a parameter $\beta$, a value for
parameter $\beta$ is one of received and assumed by the wireless
device 22.

Example G3. The WD 22 of Example G2, wherein the
parameter $\beta$ is equal to 1 such as to configure the wireless
device 22 to report all coefficients associated with the
selected at least a subset of the plurality of CSI-RS ports.

Example G4. The WD 22 of Example G3, wherein the
coefficients are non-zero coefficients.

Example G5. The WD 22 of Example G1, wherein the
quantity of the subset of the plurality of CSI-RS ports that
is selected is configured to be based on a ratio parameter $\alpha$
and a quantity of the plurality of CSI-RS ports.

Example G6. The WD 22 of Example G5, wherein the
ratio parameter $\alpha$ is equal to 1.

Example G7. The WD 22 of any one of Examples G1-G6,
wherein the processing circuitry 84 is further configured to
receive the configuration via higher layer signaling.

Example G8. The WD 22 of any one of Examples G1-G7,
wherein the configuration is a 3GPP Rel 17 Type II con-
figuration.

Example H1. A method implemented in a wireless device
22 (WD 22) that is configured to communicate with a
network node 16, the method comprising:

receiving a configuration for performing channel state
information, CSI, measurements on CSI-reference sig-
nal, RS, resources associated with a selection of at least
a subset of a plurality of CSI-RS ports, a quantity of the
subset of the plurality of CSI-RS ports that is selected
being based at least on a total quantity of the plurality
of CSI-RS ports;

performing CSI measurements based at least on the
received configuration; and causing transmission of a CSI report based at least on the
CSI measurements.

Example H2. The method of Example H1, wherein the
quantity of the subset of the plurality of CSI-RS ports that
is selected is based at least on a parameter $\beta$, a value for
parameter $\beta$ is one of received and assumed by the wireless
device.

Example H3. The method of Example H2, wherein the
parameter $\beta$ is equal to 1 such as to configure the wireless
device 22 to report all coefficients associated with the
selected at least a subset of the plurality of CSI-RS ports.

Example H4. The method of Example H3, wherein the
coefficients are non-zero coefficients.

Example H5. The method of Example H1, wherein the
quantity of the subset of the plurality of CSI-RS ports that
is selected is configured to be based on a ratio parameter $\alpha$
and a quantity of the plurality of CSI-RS ports.

Example H6. The method of Example H5, wherein the
ratio parameter $\alpha$ is equal to 1.

Example H7. The method of any one of Examples H1-H6,
wherein the processing circuitry is further configured to
receive the configuration via higher layer signaling.

Example H8. The method of any one of Examples H1-H7,
wherein the configuration is a 3GPP Rel 17 Type II con-
figuration.

As will be appreciated by one of skill in the art, the
concepts described herein may be embodied as a method,
data processing system, computer program product and/or
computer storage media storing an executable computer
program. Accordingly, the concepts described herein may
take the form of an entirely hardware embodiment, an
entirely software embodiment or an embodiment combining
software and hardware aspects all generally referred to
herein as a "circuit" or "module." Any process, step, action
and/or functionality described herein may be performed by,
and/or associated to, a corresponding module, which may be
implemented in software and/or firmware and/or hardware.
Furthermore, the disclosure may take the form of a computer
program product on a tangible computer usable storage
medium having computer program code embodied in the
medium that can be executed by a computer. Any suitable
tangible computer readable medium may be utilized includ-
ing hard disks, CD-ROMs, electronic storage devices, opti-
cal storage devices, or magnetic storage devices.

Some embodiments are described herein with reference to
flowchart illustrations and/or block diagrams of methods,
systems and computer program products. It will be under-
stood that each block of the flowchart illustrations and/or
block diagrams, and combinations of blocks in the flowchart
illustrations and/or block diagrams, can be implemented by
computer program instructions. These computer program
instructions may be provided to a processor of a general
purpose computer (to thereby create a special purpose
computer), special purpose computer, or other program-
mable data processing apparatus to produce a machine, such
that the instructions, which execute via the processor of the
computer or other programmable data processing apparatus,
create means for implementing the functions/acts specified
in the flowchart and/or block diagram block or blocks.

These computer program instructions may also be stored
in a computer readable memory or storage medium that can
direct a computer or other programmable data processing
apparatus to function in a particular manner, such that the
instructions stored in the computer readable memory pro-
duce an article of manufacture including instruction means
which implement the function/act specified in the flowchart
and/or block diagram block or blocks.

The computer program instructions may also be loaded
onto a computer or other programmable data processing
apparatus to cause a series of operational steps to be per-
formed on the computer or other programmable apparatus to
produce a computer implemented process such that the
instructions which execute on the computer or other pro-
grammable apparatus provide steps for implementing the
functions/acts specified in the flowchart and/or block dia-
gram block or blocks.

It is to be understood that the functions/acts noted in the
blocks may occur out of the order noted in the operational
illustrations. For example, two blocks shown in succession
may in fact be executed substantially concurrently or the
blocks may sometimes be executed in the reverse order,
depending upon the functionality/acts involved. Although
some of the diagrams include arrows on communication
paths to show a primary direction of communication, it is to
be understood that communication may occur in the oppo-
site direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device configured to communicate with a network node implementing a plurality of Channel State Information-Reference Signal, CSI-RS, ports, the wireless device comprising:
  processing circuitry configured to:
    receive a configuration of a CSI-RS resource that is associated with the plurality of CSI-RS ports;
    determine at least a subset of the plurality of CSI-RS ports for performing a CSI-RS measurement within the CSI-RS resource, the determination being based on a calculation that multiplies a total number of the plurality of CSI-RS ports with a ratio value;
    perform the CSI measurement based on the determined subset of the plurality of CSI-RS ports; and
    cause transmission of CSI feedback associated with the CSI measurement.

2. The wireless device of claim 1, wherein the ratio value is greater than 0 and less than or equal to 1.

3. The wireless device of claim 1, wherein the processing circuitry is further configured to determine a Pre-coding Matrix Indicator, PMI, based on the CSI measurement.

4. The wireless device of claim 1, wherein the ratio value is indicated by higher layer signaling.

5. The wireless device of claim 1, wherein the processing circuitry is further configured to:
  receive a configuration of a plurality of frequency domain, FD, basis vectors;
  select at least one FD basis vector from the plurality of FD basis vectors;

quantize linear combination coefficients associated with the determined at least a subset of the plurality of CSI-RS ports and the selected at least one FD basis vector; and
  the CSI feedback indicating the quantized linear combination coefficients.

6. A network node implementing a plurality of Channel State Information-Reference Signal, CSI-RS, ports, the network node comprising:
  processing circuitry configured to:
    transmit a configuration of a CSI-RS resource; and
    receive CSI feedback based on a CSI measurement, the CSI measurement being based on at least a subset of the plurality of CSI-RS ports within the CSI-RS resource, the at least the subset of the plurality of CSI-RS ports being based on a calculation that multiplies a total number of the plurality of CSI-RS ports with a ratio value.

7. The network node of claim 6, wherein the ratio value is greater than 0 and less than or equal to 1.

8. The network node of claim 6, wherein the CSI feedback includes a Pre-coding Matrix Indicator, PMI, that is based on the CSI measurement.

9. The network node of claim 6, wherein the processing circuitry is further configured to cause transmission via higher layer signaling of an indication that indicates the ratio value.

10. The network node of claim 9, wherein the processing circuitry is further configured to cause transmission of a configuration of a plurality of frequency domain, FD, basis vectors; and
  the CSI feedback indicating a quantized linear combination coefficients that are associated with the at least a subset of the plurality of CSI-RS ports and at least one FD basis vector.

11. A method implemented in a wireless device that is configured to communicate with a network node implementing a plurality of Channel State Information-Reference Signal, CSI-RS, ports, the method comprising:
  receiving a configuration of a CSI-RS resource that is associated with the plurality of CSI-RS ports;
  determining at least a subset of the plurality of CSI-RS ports for performing a CSI-RS measurement within the CSI-RS resource, the determination being based on a calculation that multiplies a total number of the plurality of CSI-RS ports with a ratio value; and
  performing the CSI measurement based on the determined subset of the plurality of CSI-RS ports; and
  causing transmission of CSI feedback associated with the CSI measurement.

12. The method of claim 11, wherein the ratio value is greater than 0 and less than or equal to 1.

13. The method of claim 11, further comprising determining a Pre-coding Matrix Indicator, PMI, based on the CSI measurement.

14. The method of claim 11, wherein the ratio value is indicated by higher layer signaling.

15. The method of claim 11, further comprising:
  receiving a configuration of a plurality of frequency domain, FD, basis vectors;
  selecting at least one FD basis vector from the plurality of FD basis vectors;
  quantizing linear combination coefficients associated with the determined at least a subset of the plurality of CSI-RS ports and the selected at least one FD basis vector; and the CSI feedback indicating the quantized linear combination coefficients.

16. A method implemented by a network node that is implementing a plurality of Channel State Information-Reference Signal, CSI-RS, ports, the method comprising:

transmitting a configuration of a CSI-RS resource; and receiving CSI feedback based on a CSI measurement, the CSI measurement being based on at least a subset of the plurality of CSI-RS ports within the CSI-RS resource, the at least the subset of the plurality of CSI-RS ports being based on a calculation that multiplies a total number of the plurality of CSI-RS ports with a ratio value.

17. The method of claim 16, wherein the ratio value is greater than 0 and less than or equal to 1.

18. The method of claim 16, wherein the CSI feedback includes a Pre-coding Matrix Indicator, PMI, that is based on the CSI measurement.

19. The method of claim 16, further comprising causing transmission via higher layer signaling of an indication that indicates the ratio value.

20. The method of claim 19, further comprising causing transmission of a configuration of a plurality of frequency domain, FD, basis vectors; and the CSI feedback indicating a quantized linear combination coefficients that are associated with the at least a subset of the plurality of CSI-RS ports and at least one FD basis vector.

* * * * *